(12) United States Patent
Niemela et al.

(10) Patent No.: US 7,293,723 B2
(45) Date of Patent: *Nov. 13, 2007

(54) MATERIAL HANDLING DEVICE FOR VEHICLE

(75) Inventors: Cal G Niemela, Chassell, MI (US); Philip J Quenzi, Atlantic Mine, MI (US)

(73) Assignee: Rockit Corp., Calumet, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/489,837

(22) Filed: Jul. 20, 2006

(65) Prior Publication Data

US 2006/0255189 A1 Nov. 16, 2006

Related U.S. Application Data

(63) Continuation-in-part of application No. 10/855,207, filed on May 27, 2004, now Pat. No. 7,104,478.

(60) Provisional application No. 60/475,543, filed on Jun. 3, 2003.

(51) Int. Cl.
*A01C 19/00* (2006.01)

(52) U.S. Cl. ............... 239/672; 239/661; 239/663; 239/665; 239/650; 296/26.09; 296/37.6; 296/166; 296/171; 296/173

(58) Field of Classification Search ............... 239/661, 239/663, 665, 672; 296/26.09, 166, 171, 296/173, 37.6
See application file for complete search history.

(56) References Cited

U.S. PATENT DOCUMENTS

| 507,122 A | 10/1893 | Harrington |
| 788,648 A | 5/1905 | Kinney |
| 862,597 A | 8/1907 | Wilson |
| 2,514,843 A | 7/1950 | Clement |
| 3,071,382 A * | 1/1963 | De Biasi ............ 239/660 |
| 3,656,638 A | 4/1972 | Hutton et al. |
| 3,722,717 A | 3/1973 | Stryczek |
| 3,754,711 A | 8/1973 | Gledhill |
| 3,815,764 A | 6/1974 | Gilfillan et al. |
| 4,002,272 A | 1/1977 | Crawford et al. |
| 4,162,735 A | 7/1979 | Lewis |
| 4,394,976 A | 7/1983 | Rae |
| 4,405,089 A | 9/1983 | Taylor |
| 4,830,242 A * | 5/1989 | Painter ............ 224/42.32 |
| 4,842,471 A | 6/1989 | Hodgetts |

(Continued)

*Primary Examiner*—Kevin Shaver
*Assistant Examiner*—Trevor McGraw
(74) *Attorney, Agent, or Firm*—Van Dyke, Gardner, Linn & Burkhart, LLP

(57) ABSTRACT

A material handling device for a vehicle includes a receiving portion for receiving material, a material moving system operable to move material along the receiving portion, a material processing device attachable at a rear of the receiving portion, and a power source. The receiving portion is configured to fit at a vehicle bed, and is removably positioned at a vehicle bed. The material handling device may be movably supported at a support surface to ease installation and removal of said material handling device at the vehicle. The material processing device is operable to dispense material from within the receiving portion to a location external the receiving portion and/or collect material from a location external the receiving portion and dispense the collected material into the receiving portion. The power source may provide power to the material processing device and/or the material moving device.

28 Claims, 28 Drawing Sheets

U.S. PATENT DOCUMENTS

| | | | |
|---|---|---|---|
| 4,993,088 A * | 2/1991 | Chudik | 5/118 |
| 5,281,074 A | 1/1994 | Mashuda | |
| 5,314,290 A | 5/1994 | Lutz et al. | |
| 5,649,731 A * | 7/1997 | Tognetti | 296/26.09 |
| 5,927,617 A | 7/1999 | Musso, Jr. et al. | |
| 5,988,534 A | 11/1999 | Kost et al. | |
| 6,056,497 A | 5/2000 | Holz | |
| 6,131,830 A * | 10/2000 | Jones | 239/654 |
| 6,173,904 B1 | 1/2001 | Doherty et al. | |
| 6,206,302 B1 * | 3/2001 | Hansen et al. | 239/289 |
| 6,209,808 B1 | 4/2001 | Anderson | |
| 6,318,781 B1 * | 11/2001 | Mc Kee | 296/26.09 |
| 6,328,364 B1 * | 12/2001 | Darbishire | 296/26.09 |
| 6,422,490 B1 | 7/2002 | Truan et al. | |
| 6,446,879 B1 | 9/2002 | Kime | |
| 6,698,997 B2 * | 3/2004 | Arne et al. | 414/502 |
| 6,719,226 B2 | 4/2004 | Rajewski | |
| 6,817,551 B2 | 11/2004 | Williams et al. | |
| 6,893,340 B1 | 5/2005 | Schmidt et al. | |
| 6,938,829 B2 | 9/2005 | Doherty et al. | |
| 6,945,385 B2 | 9/2005 | Ackerman et al. | |
| 7,104,478 B2 * | 9/2006 | Niemela et al. | 239/672 |

* cited by examiner

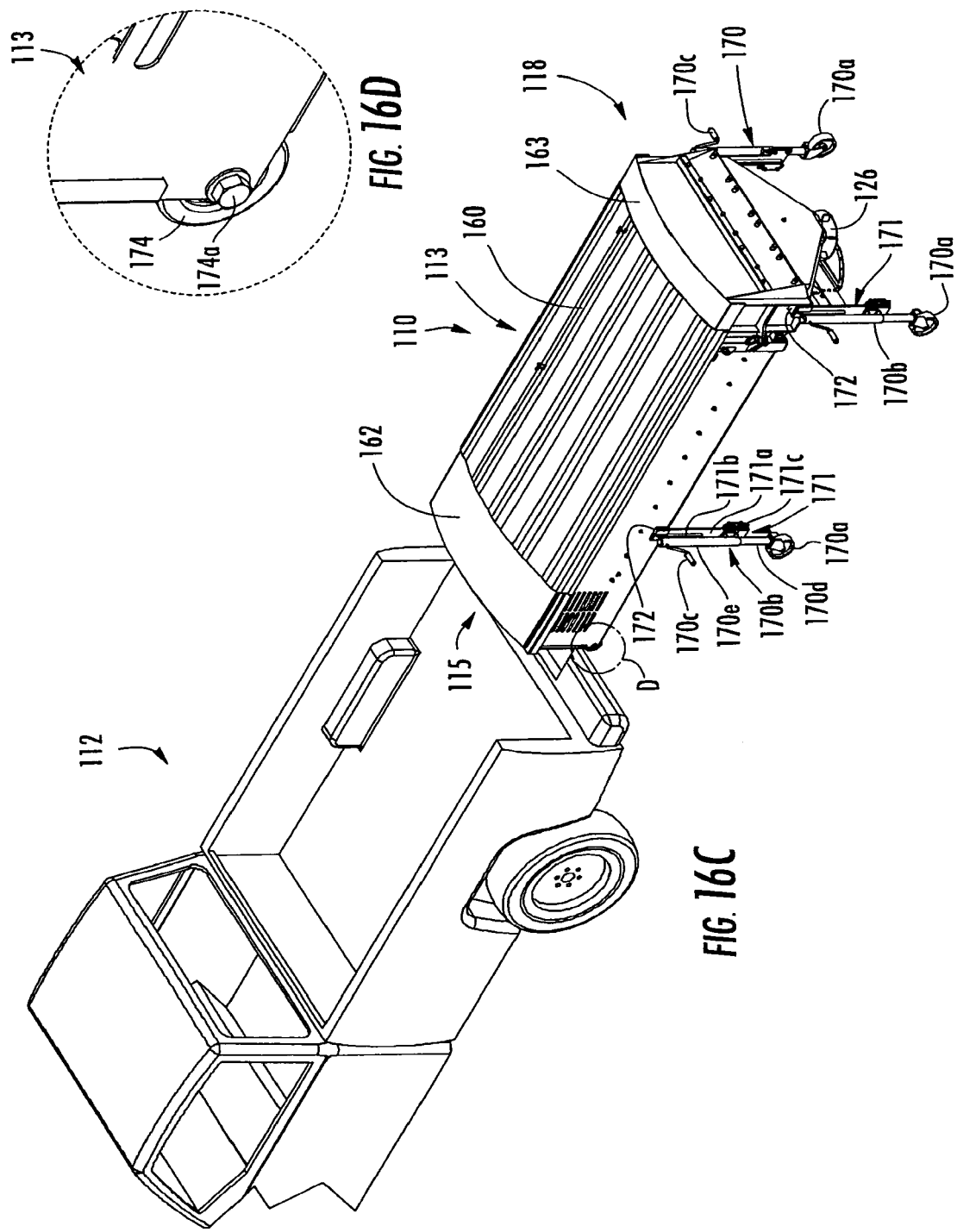

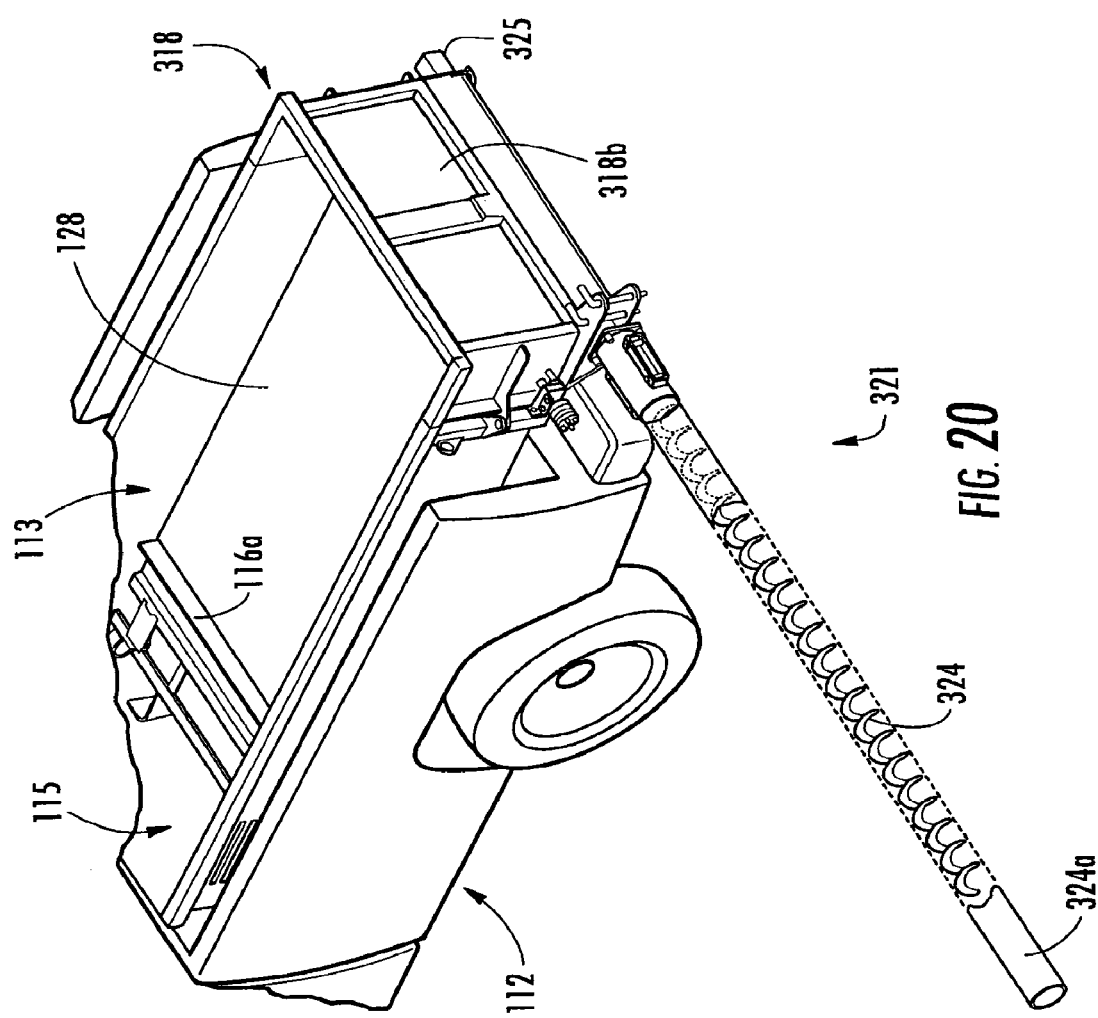

US 7,293,723 B2

MATERIAL HANDLING DEVICE FOR VEHICLE

CROSS REFERENCE TO RELATED APPLICATIONS

The present application is a continuation-in-part of U.S. patent application Ser. No. 10/855,207, filed May 27, 2004, now U.S. Pat. No. 7,104,478, which claims benefit of U.S. provisional application, Ser. No. 60/475,543, filed Jun. 3, 2003, which are hereby incorporated herein by reference in their entireties.

FIELD OF THE INVENTION

The present invention relates generally to material handling or spreading devices and, more particularly, to salt spreading devices which may be used with a pickup truck or the like. The present invention may be suitable for spreading other materials, such as dirt, sand, fertilizer, gravel, mulch, soil, seeds or the like.

BACKGROUND OF THE INVENTION

During cold or winter-like conditions, commercial parking lots and roadways typically have deicing salt applied to their surfaces by contractors with tailgate and vee box salt spreaders. Typically, certain aspects of handling and spreading salt with conventional vee box and tailgate spreaders are inefficient and unsafe, as well as impractical for some operators.

At approximately an eight to ten cubic foot maximum capacity, conventional tailgate spreaders typically do not hold enough material to cover a desired or targeted area, and therefore require the operator to refill the hopper frequently during the salting operation. This refilling process is often performed in the darkness of early morning or late night, and often during inclement weather. While stopping to refill the hopper is time consuming, it also may be a hazard to the operator to climb in and out of the truck bed under these conditions to perform this task. Reports of injuries sustained by this activity are not uncommon.

Many contractors, lacking a facility to store bulk salt and/or a loading method, would likely prefer to stay in the truck cab and increase their operating efficiency by having a larger capacity tailgate spreader. However, due to the over-slung position of conventional tailgate spreaders, it is typically impractical if not impossible to significantly increase the volume or weight capacity of such tailgate spreaders.

Vee box spreaders on the other hand typically have a much larger capacity, thereby increasing efficiency and avoiding the requirement that the operator make frequent stops to refill or service the equipment, thus reducing the exposure to injury. However, while tailgate spreaders utilize bagged salt, vee box spreaders are designed to utilize loose bulk material, requiring both a storage area and a means of loading the salt into the spreader box. Also, such vee box spreaders extend substantially upward above the truck bed and restrict or even substantially block the rearward view of the driver of the vehicle.

Other types of equipment for spreading or moving or collecting material or dirt or debris may be transported and carried by a separate vehicle or trailer. Thus, if a person wants to spread salt during the winter months and perform other functions during the summer months, such as collect leaves or grass or clean road surfaces or the like, separate vehicles or trailers are typically necessary to carry out the different functions.

Therefore, there is a need in the art for a material handling or spreading device or assembly which overcomes the shortcomings of the prior art.

SUMMARY OF THE INVENTION

The present invention provides an alternative to the small tailgate spreaders and other material loading/unloading/carrying apparatus' for contractors who desire to provide different services and to increase spreading efficiency, but may not have the means to handle bulk material. The material handling device of the present invention is removably positionable within a pickup truck bed and may dispense and spread material from the receiving portion, either material from bags of material or bulk material. The material handling device may provide other functions as well, such as a vacuuming function or a chipper/shredder function or a street cleaning function or other dispensing functions or the like. The different functions or services may be changed over via removing and replacing a material processing device at the rear of the apparatus and generally at the rear of the vehicle.

According to an aspect of the present invention, a self-contained material handling system for a vehicle includes a receiving portion for receiving material and a material processing device attachable at a rear of the receiving portion so as to be at a rear of the vehicle bed when the receiving portion is within the vehicle bed. The receiving portion is configured to fit within a vehicle bed and is removably positioned within a vehicle bed. The material processing device is operable to at least one of (a) dispense material from within the receiving portion to a location external the vehicle bed and (b) collect material from a location external the vehicle bed and dispense the material into the receiving portion. The receiving portion and the material processing device are supported at the ground by at least one wheel when the receiving portion is at least partially removed from the vehicle bed.

The receiving portion is configured to fit within or at a vehicle, such as at or in or partially in a pickup truck bed, with the material processing device or hopper assembly being mountable at a rear end of the receiving portion so as to provide a self-contained unit or machine or device that is capable of providing the desired function while being carried in a pickup truck bed. The material processing device may be pivotally mounted or removably mounted at the rear end of the receiving portion, so that the material processing device may be moved or pivoted to an open position or removed to facilitate loading or unloading of the receiving portion by a person on the ground outside of the pickup truck bed or to facilitate changeover of the material handling device to provide a different function via a different material processing device being attached to the receiving portion.

The receiving portion may include a material moving device for moving material along the receiving portion. The material moving device may comprise a movable bulkhead or push plate which is movable to push bags of material or bulk material toward the material processing device or hopper assembly or toward an open end of the receiving portion when the material processing device is open or removed from the receiving portion. The movable bulkhead may be movable via a rotatably driven sprocket engaging a track extending generally along the receiving portion. The material moving device may include a conveyor along a lower portion of the receiving portion for conveying the bags of material toward the hopper assembly. The material moving device may be operable in response to a limit sensor detecting a threshold low level of material in the dispensing bin.

According to another aspect of the present invention, a self-contained material handling system for a vehicle includes a receiving portion for receiving material, a material moving system operable to move material along the receiving portion, a material processing device attachable at a rear of the receiving portion so as to be generally at a rear of the vehicle bed when the receiving portion is within the vehicle bed, and a power source at a forward portion of the receiving portion. The receiving portion is configured to fit within a vehicle bed, and is removably positioned within a vehicle bed. The material processing device is operable to at least one of (a) dispense material from within the receiving portion to a location external the vehicle bed and (b) collect material from a location external the vehicle bed and dispense the material into the receiving portion. The power source is selectively operable to (a) provide power to at least one motor of the material processing device and (b) provide power to at least one motor of the material moving device.

Therefore, the present invention provides a material handling device or assembly or system which is configured to fit within the bed of a pickup and which may receive and spread or dispense a substantial amount of material over a targeted area, or may collect a substantial amount of material from a targeted area and dispense and store the material in the receiving portion. The material handling device is readily installed into a pickup truck bed and readily removed therefrom when not in use. The material handling device may be supported via a plurality of wheels or rollers when not positioned in the pickup truck bed so that the material handling device is readily moved and installed/removed with reduced manual labor and lifting. The material handling device may provide multiple functions and may be readily changed to other functions via removal of one material processing device from the receiving portion and attachment and connection of another material processing device to the receiving portion. The present invention thus provides a self-contained material handling device or assembly or system which is capable of providing different functions at a pickup truck bed, depending on the particular application of the material handling device or assembly or system.

These and other objects, advantages, purposes and features of the present invention will become apparent upon review of the following specification in conjunction with the drawings.

BRIEF DESCRIPTION OF THE DRAWINGS

FIGS. 16A-C are upper perspective views of a vehicle having a removable wheeled material handling device in accordance with the present invention, showing the material handling device at different degrees of insertion/retraction relative to the vehicle;

FIG. 16D is an enlarged perspective view of the region D in FIG. 16C;

FIG. 20 is an upper perspective view of a vehicle having the material handling device of the present invention, with a side discharge device at the rearward end of the material handling device;

DESCRIPTION OF THE PREFERRED EMBODIMENTS

Figure 1:
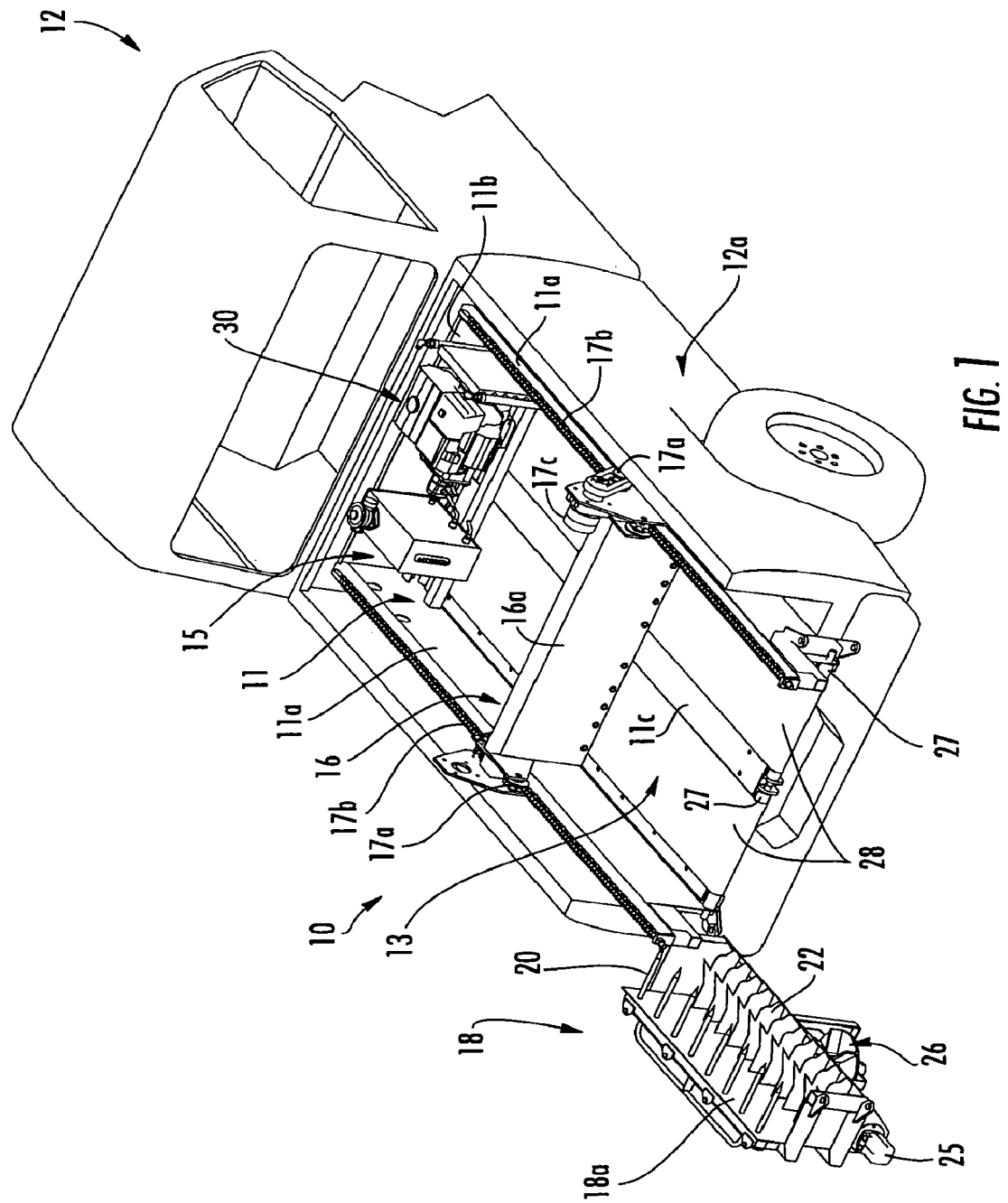
FIG. 1 is an upper perspective view of a rear portion of a vehicle having a material handling or spreading assembly in accordance with the present invention positioned thereon.

Referring now to the drawings and the illustrative embodiments depicted therein, a material handling device of the present invention is positionable at or mountable at a vehicle, such as at a bed of a pickup truck or the like. The material handling device may be removably positioned at the vehicle bed and may be movably supported by a plurality of wheels when removed from the bed. The material handling device may have a removable/changeable material processing device that is selectable to provide the desired function, such as a material spreading function, a material collecting function, a material carrying or transporting function or other material processing function, at a common material receiving portion of the device at the vehicle. The material handling device of the present invention thus provides various functions and capabilities at a vehicle bed, such as discussed below.

Figure 5:
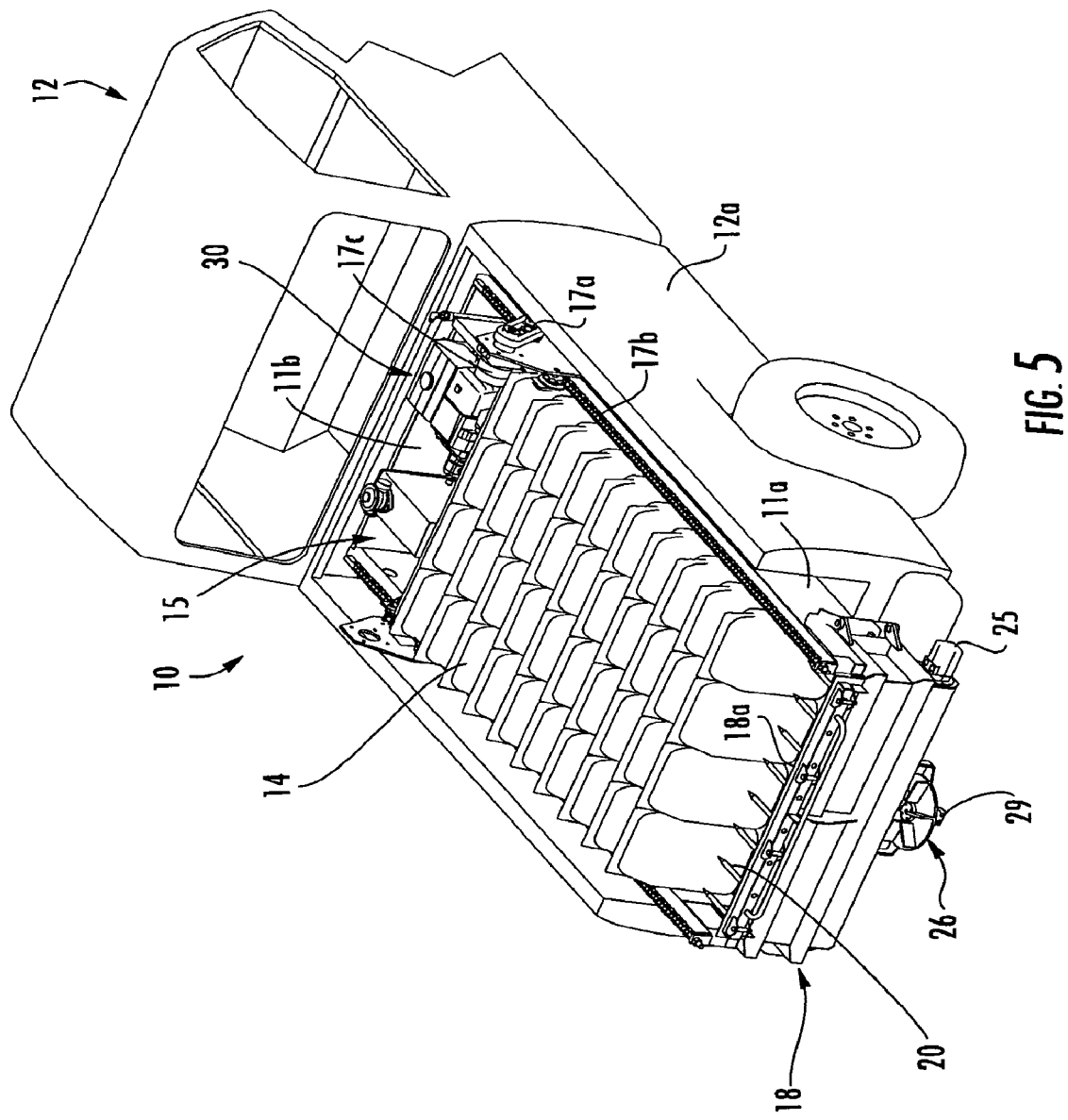
FIG. 5 is another perspective view similar to FIG. 2, with the material spreading assembly being substantially filled with bags of material.
Figure 6:
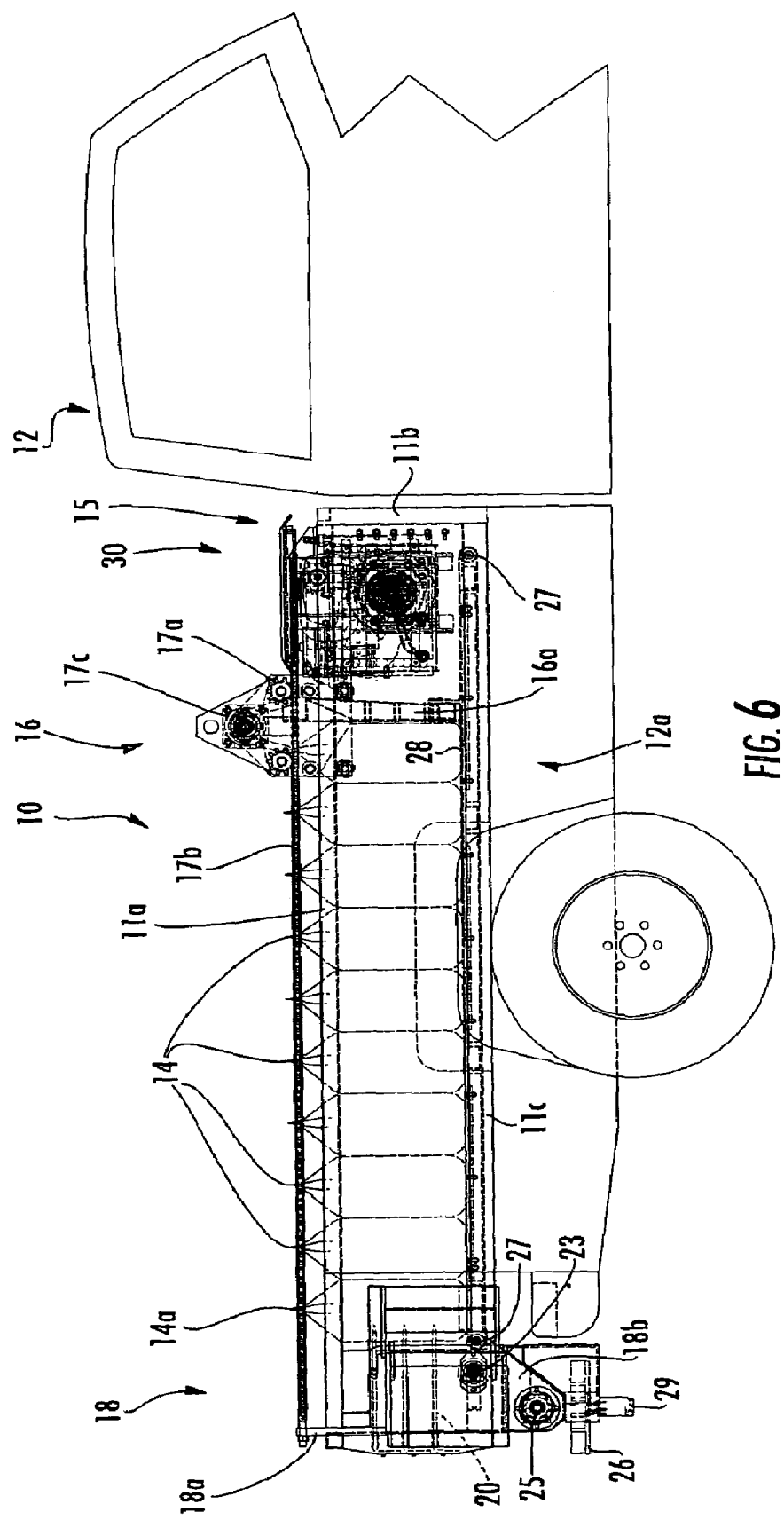
FIG. 6 is a side elevation and partial sectional view of the vehicle of FIG. 5.
Figure 7:
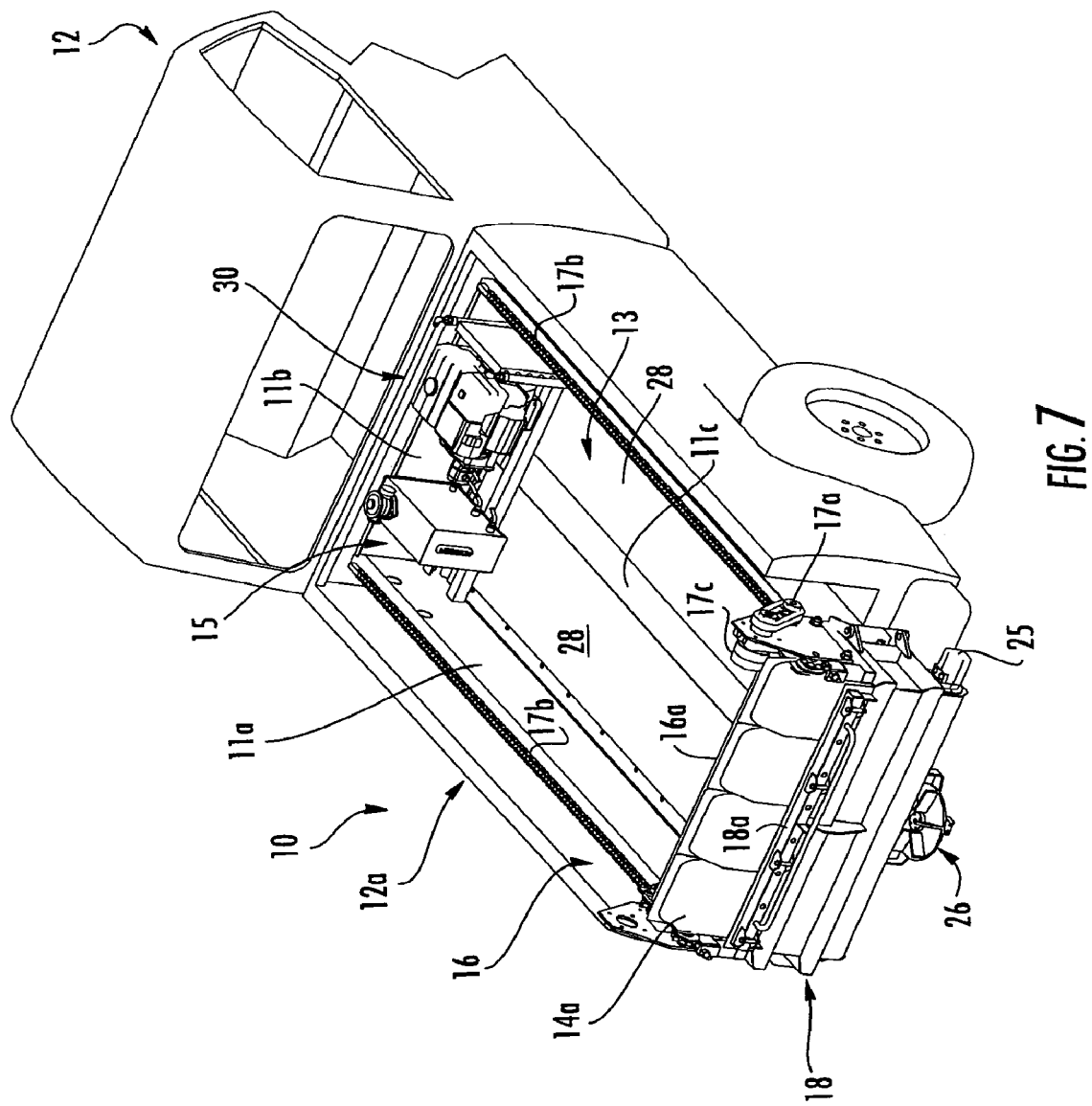
FIG. 7 is a perspective view similar to FIG. 5, with the material spreading assembly being substantially emptied.

In the illustrated embodiment of FIGS. 1-12, a material handling device or assembly or system or material spreading device or assembly or salt spreader assembly 10 is positionable within a bed portion 12a of a vehicle 12 and is operable to dispense and spread salt or other material therefrom (FIGS. 1, 2 and 5-7). Material spreader assembly 10 includes a material receiving portion or magazine 13, which is positionable in the bed portion 12a and is configured to receive and hold containers or bags 14 of salt or other material (FIGS. 5-7). The term "bags of material", as used herein, refers to bags or containers that contain material therein and that may be placed in the receiving portion unopened and with the bag intact and holding the material within the initially intact bag. Material spreader assembly 10 is operable to empty the material from the bags and to spread the material over the targeted area. Material spreader assembly 10 includes a material moving or pushing device 16, which is movable along the receiving portion 13 to push the bags 14 toward a material processing device or hopper assembly 18 positioned at the rear of the receiving portion 13. Hopper assembly 18 includes a plurality of bag holders or spikes or spears or members 20 for piercing the rear most row of bags 14a (FIGS. 6 and 7) at the hopper and for supporting and retaining the pierced bags while bag openers 22, such as knives or blades or the like, slice, cut or tear or otherwise open the bags at the bottom portion of the bags to allow the material within the bags to be deposited into the hopper dispensing bin, as discussed below. The hopper assembly 18 may further include a hopper auger device or dispensing device 24 (FIG. 4) for moving the material to a discharge opening or hole in the hopper bin, whereby the material may be spread or broadcast by a spinner disc 26 or the like, as discussed below.

As best shown in FIG. 1, material spreader assembly 10 may comprise a frame portion 11, which includes a pair of side frames 11a, a front frame or wall portion 11b and a base or floor portion 11c. The frame portion 11 defines the receiving portion or area 13 and is configured to receive the material or bags of material to be spread or broadcast. The frame portion 11 of material spreader assembly 10 may be sized to fit within the pickup truck bed (or may comprise the side walls of a pickup truck bed), such that the material spreader assembly may be implemented at a standard pickup truck or the like with minimal or no modifications being necessary to the pickup truck. For example, in the illustrated embodiment, the material spreader assembly is approximately 48 inches wide and 120 inches long, such that it may fit within a standard pickup truck bed. The frame portion 11 may be constructed of tubular steel or other durable, rigid and strong material to support the weight of the bags when loaded. A power source or power means 30, such as a gas powered engine and hydraulic pump, may be provided at a forward end or compartment 15 of frame portion 11 to provide pressurized fluid to one or more hydraulic motors which are operable to drive or control various components of material spreader assembly 10, as discussed below.

Material moving or pushing device 16 comprises a generally vertical wall portion or bulkhead or push plate 16a, which is movable along the length of the receiving portion 13 to push the bags of salt or other material toward the rear of the vehicle and thus toward the hopper assembly 18. In the illustrated embodiment, the bulkhead 16a extends at least substantially across the receiving portion 13 and between side walls or frames 11a. Bulkhead 16a may be movable relative to sidewalls 11a via at least one rotatably driven gear member 17a which may rotatably and drivably engage a chain or track or the like 17b extending along one or more of the sidewalls 11a of the receiving portion 13. As shown in FIGS. 1, 2, 5 and 7, a chain or track 17b may be positioned along each sidewall 11a, with sprocket wheels 17a rotatably engaging the tracks 17b to guide and/or drive the bulkhead 16a along sidewalls 11a.

Optionally, the base frame portion 11c of frame portion 11 may include a plurality of rollers 27 extending thereacross for rotatably driving and/or supporting one or more conveyor belts 28. Bulkhead 16a may also be connected to or attached to the conveyor belts 28, which extend along and at least partially define the floor of the receiving portion 13. As bulkhead 16a is moved or driven and/or as the conveyor belts 28 are moved or driven toward the rear of the receiving portion 13, the bags 14 of salt or other material are also moved toward the rear of the receiving portion 13 and toward and into engagement with the hopper assembly 18, as discussed below. The drivable gear member 17a may be rotatably driven by a hydraulic motor 17c positioned at material moving assembly 16 and/or the conveyor 28 may be driven by a hydraulic motor (not shown). The motor or motors may be powered or driven via the gas powered engine 30 and pump or power means.

Figure 2:
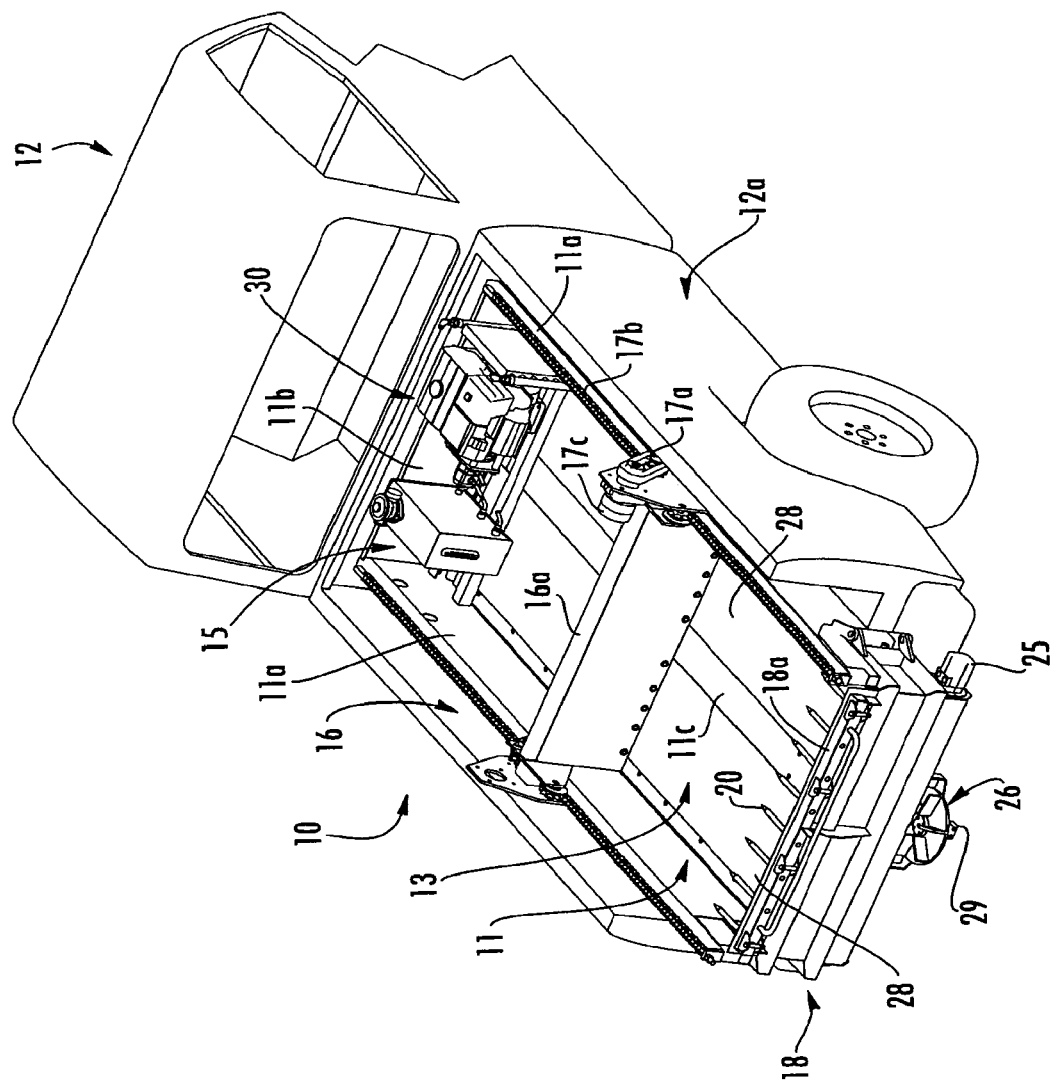
FIG. 2 is another perspective view similar to FIG. 1, with the hopper/tailgate in the closed position.

Hopper assembly 18 may be mounted to the rear end of side frames 11a at the rear of the bed 12a of the vehicle 12, such as via a hinge type mounting arrangement or the like, in order to allow the hopper assembly 18 to be opened sidewardly (as shown in FIG. 1) to ease loading of the receiving portion 13 with the bags of salt or other material (although other means for mounting or removably mounting or movably mounting the hopper assembly to the vehicle may be implemented without affecting the scope of the present invention). When the receiving portion 13 has been filled to a desired amount, the hopper assembly 18 may be pivoted or swung to the closed position (as shown in FIG. 2) and latched or pinned in the closed position. Optionally, the hopper assembly may also or otherwise be pivotable about a generally horizontal pivot axis, as discussed below.

Figure 3:
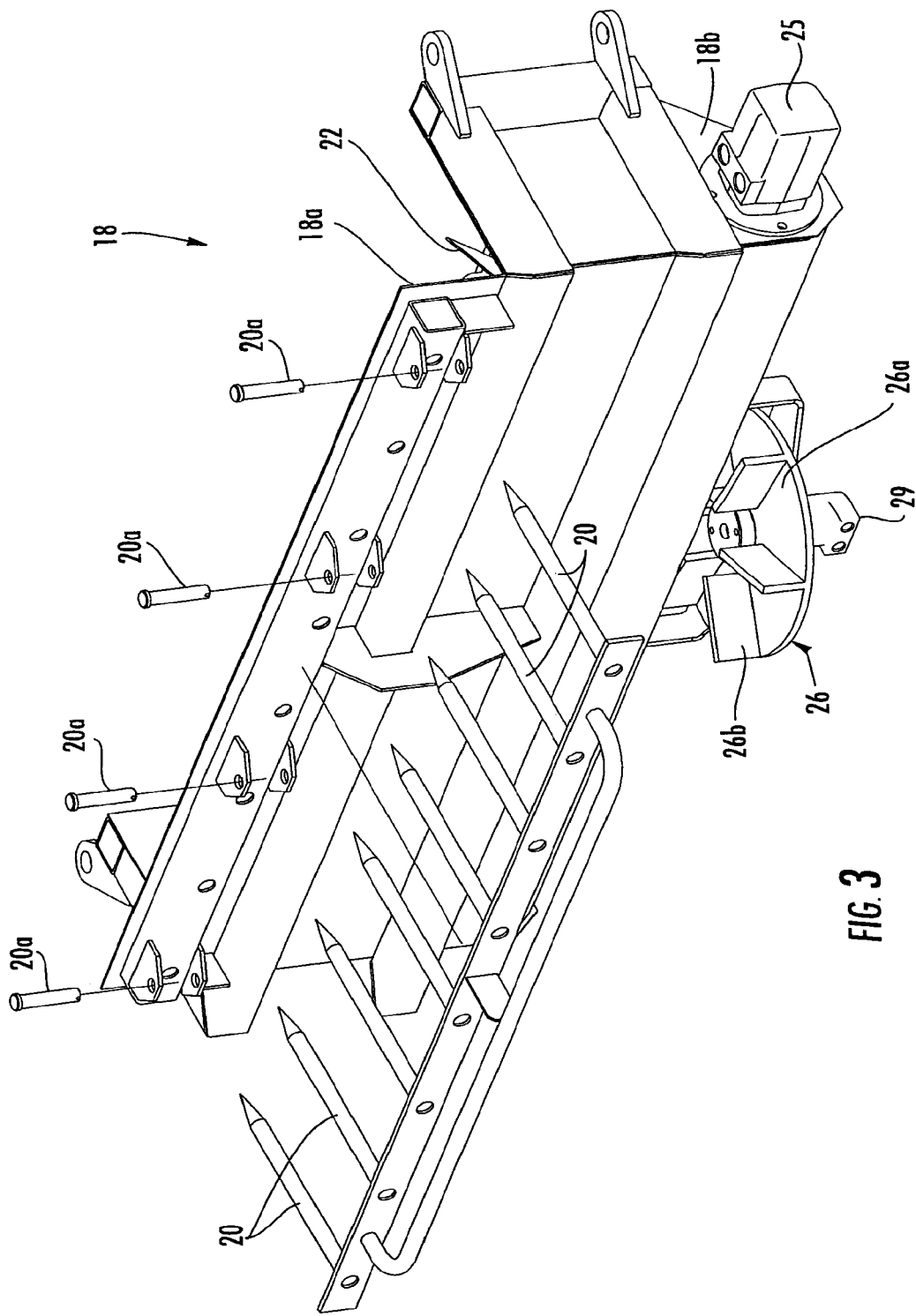
FIG. 3 is a perspective and partially exploded view of the hopper assembly of the material spreading assembly of the present invention.
Figure 4:
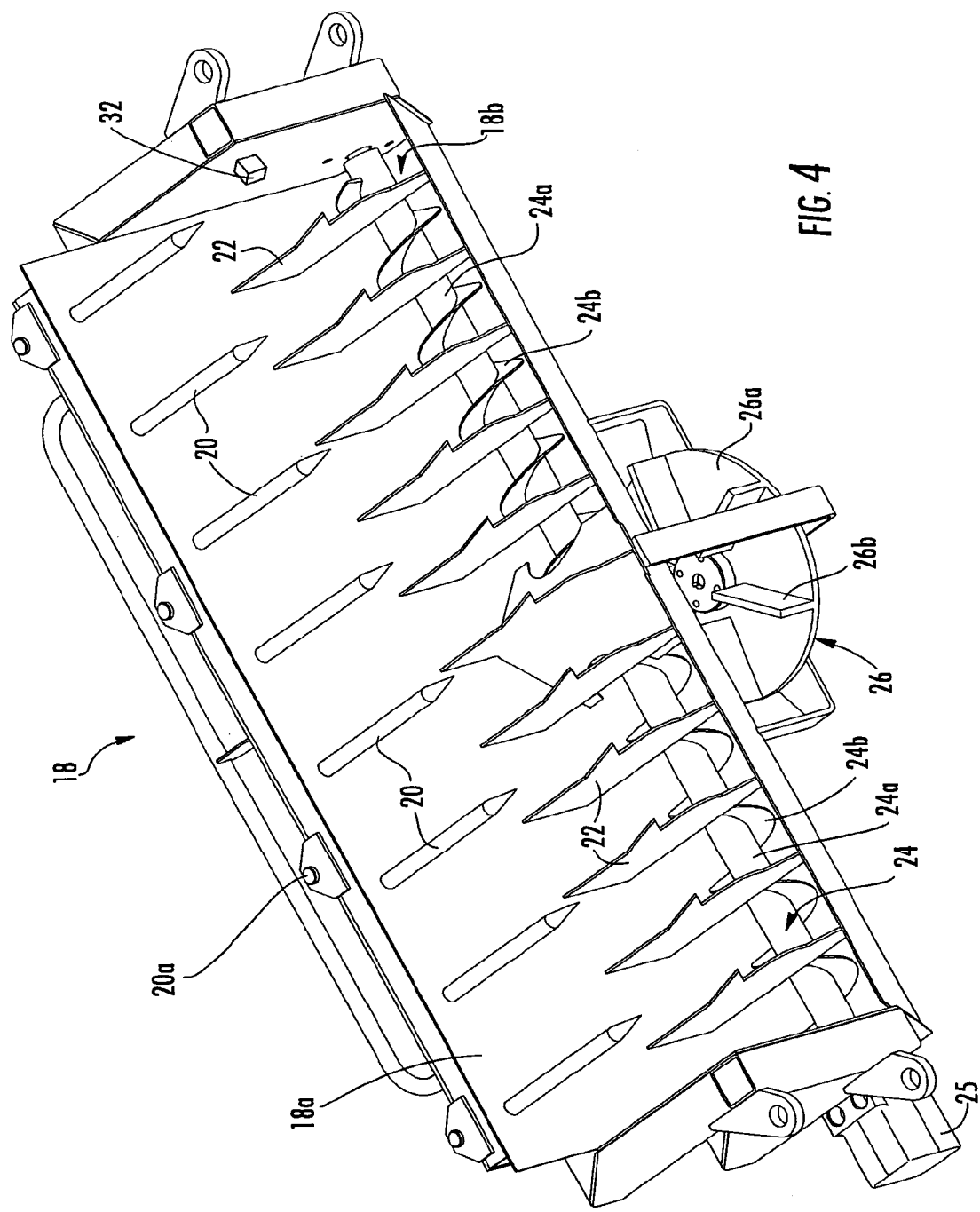
FIG. 4 is a perspective view of an upper and forward portion of the hopper assembly of the material spreading assembly of the present invention.

As can be seen in FIGS. 1-6, hopper assembly 18 includes a plurality of bag holders or spikes or spears or forwardly extending rods or members 20, which extend forwardly from a rear wall 18*a* of hopper assembly 18 and which may have a substantially sharpened or pointed end. The spikes 20 function to engage and pierce the rearward row of bags 14*a* of salt or other material as the bags 14 are moved rearwardly toward and into hopper assembly 18 via movement of bulkhead 16*a* and/or conveyor belts 28. As shown in FIG. 3, the bag holders or spikes or spears 20 may be removably attached or mounted to the rear wall 18*a* of hopper assembly 18 via a plurality of mounting pins 20*a*.

Hopper assembly 18 also includes a plurality of blades or knives or slicing members or bag opening devices 22 (FIGS. 1, 3 and 4), which are positioned generally beneath the bag holders or spikes or spears 20 and along a lower portion of hopper assembly 18. The opening devices 22 function to engage and slice or rip or cut or otherwise open the bottom portions of the bags 14 as the bags are pushed toward and into the hopper assembly 18 and onto the bag holders 20. The opening devices 22 may comprise generally fixed pointed or jagged blades extending upward and forwardly with respect to the hopper and to the vehicle to engage and cut or rip the bottoms of the bags as the bags are moved into the hopper assembly and generally over the cutting devices and the dispensing bin.

Optionally, the opening devices may be movable blades or cutting devices, and may be driven to oscillate or move or vibrate to enhance the cutting or opening of the bags with the opening devices, without affecting the scope of the present invention. For example, and with reference to FIGS. 8-11, the opening devices or blades may be generally circular blades 22', which may be rotatably driven to cut or saw through the bottoms of the bags, as discussed below. Optionally, it is envisioned that the opening device or blades may be any other cutting means or blade or device which may function to rip, cut, tear, slice or otherwise open the bottoms of the bags 14 as the bags are moved into the hopper assembly via the material moving assembly, without affecting the scope of the present invention. The bag opening devices thus may open a lower end or portion of the bags, while the bags are suspended by the bag holders or spikes, such that the material or contents of the bags may readily dispense from the suspended bags into a material collecting portion of the hopper assembly 18.

Hopper assembly 18 includes the collecting portion or region or material dispensing chamber or bin 18*b* at a lower portion of the hopper assembly 18 for collecting the salt or other material as it is deposited or emptied from the held or suspended bags 14. The hopper assembly 18 may include an auger device or other material moving or dispensing device 24 positioned along dispensing bin 18*b* and operable to move or guide the material within the dispensing bin toward the center portion of the dispensing bin, where the dispensing bin may include a drain opening or discharge opening or hole for the salt or other material to discharge therethrough. The auger assembly 24 may comprise an elongated shaft 24*a* with opposite directed flighting 24*b*, such that rotation of the shaft in one direction will convey the material at either side of the discharge opening toward the generally centered discharge opening. A drive motor 25 may be provided to rotatably drive the outer shaft 24*a* in the desired direction to move the material toward the center of the hopper assembly 18. The drive motor 25 may comprise a hydraulic motor which is operable in response to pressurized fluid from the power source or engine 30 and pump.

Hopper assembly 18 further includes a spinner disc or broadcasting disc or element 26 (or other suitable means for spreading or broadcasting the material over the targeted area), which may be positioned at a generally central region of the hopper assembly 18 and, generally below the discharge opening in the dispensing bin 18*b* of hopper assembly 18. Spinner disc 26 comprises a generally circular disc 26*a* with a plurality of upward extending flanges or members 26*b*, and functions to rotate or spin and throw or discharge or broadcast the material dispensed from the dispensing bin 18*b* in all directions as the material is dispensed from the dispensing bin 18*b* of hopper assembly 18. Spinner disc 26 may be rotatably driven at a desired speed by a hydraulic motor 29 (FIG. 6), which may in turn be powered or driven by power source 30. The rate or speed of rotation may be selected and/or controlled by the user, and may be selected in conjunction with a rate of movement of the salt bags to the hopper assembly and/or a rate of travel of the vehicle, in order to dispense the salt or material at a desired rate at the road surface.

Figure 8:
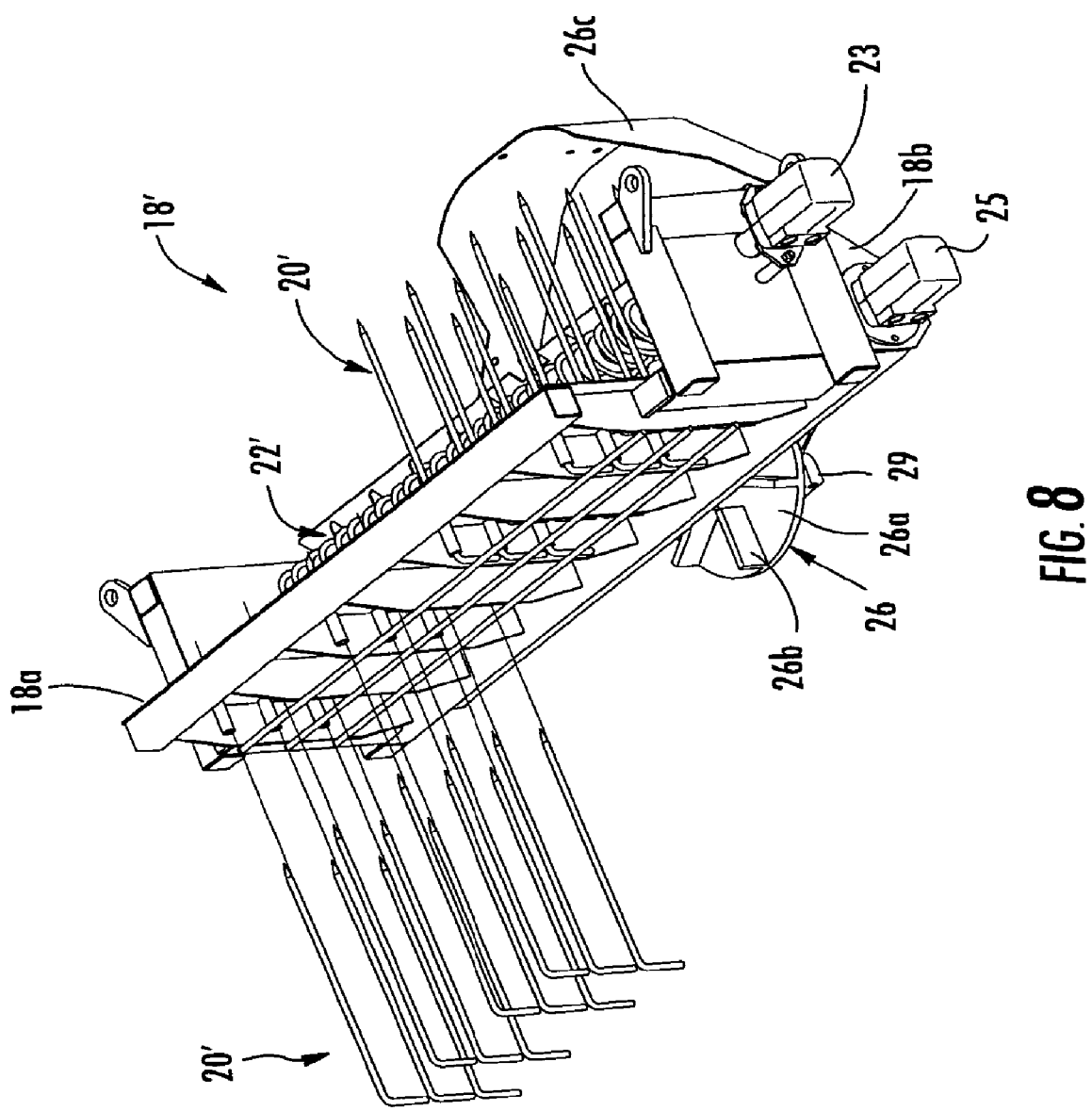
FIG. 8 is a perspective and partially exploded view of another hopper assembly in accordance with the present invention.
Figure 9:
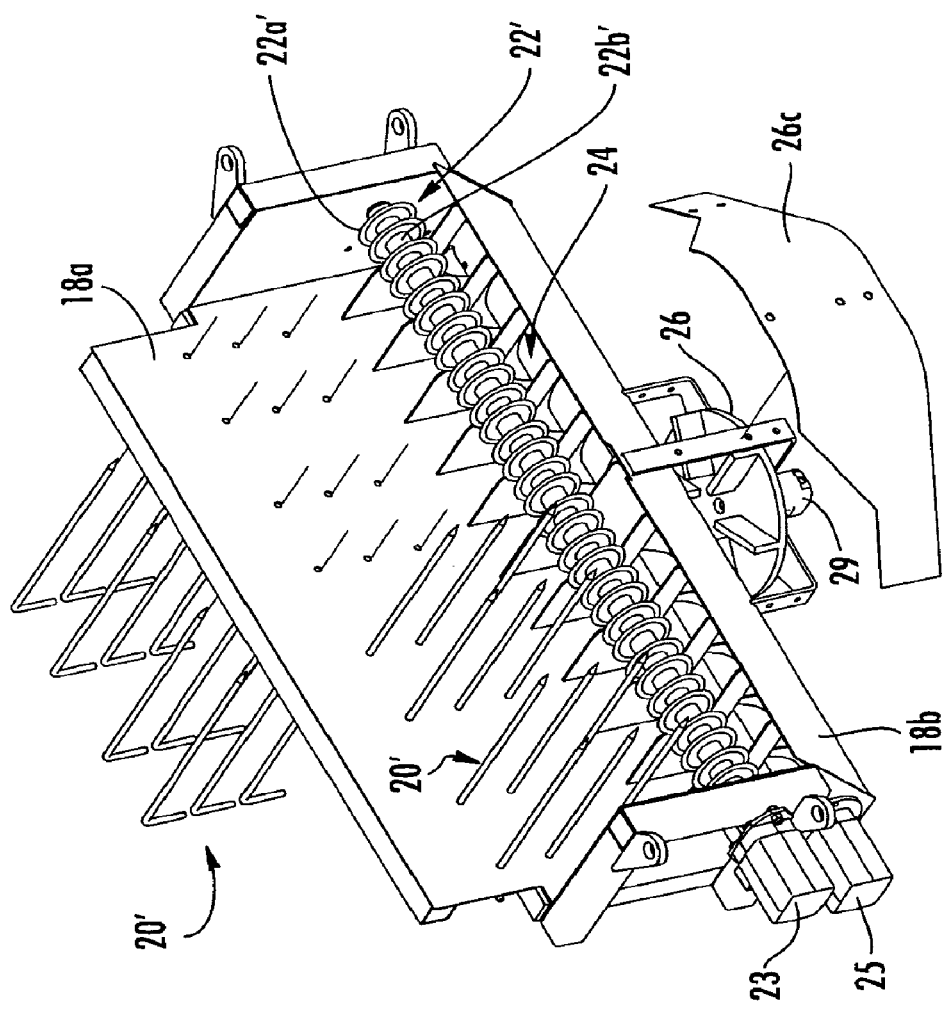
FIG. 9 is an opposite perspective and partially exploded view of the hopper assembly of FIG. 8.
Figure 10:
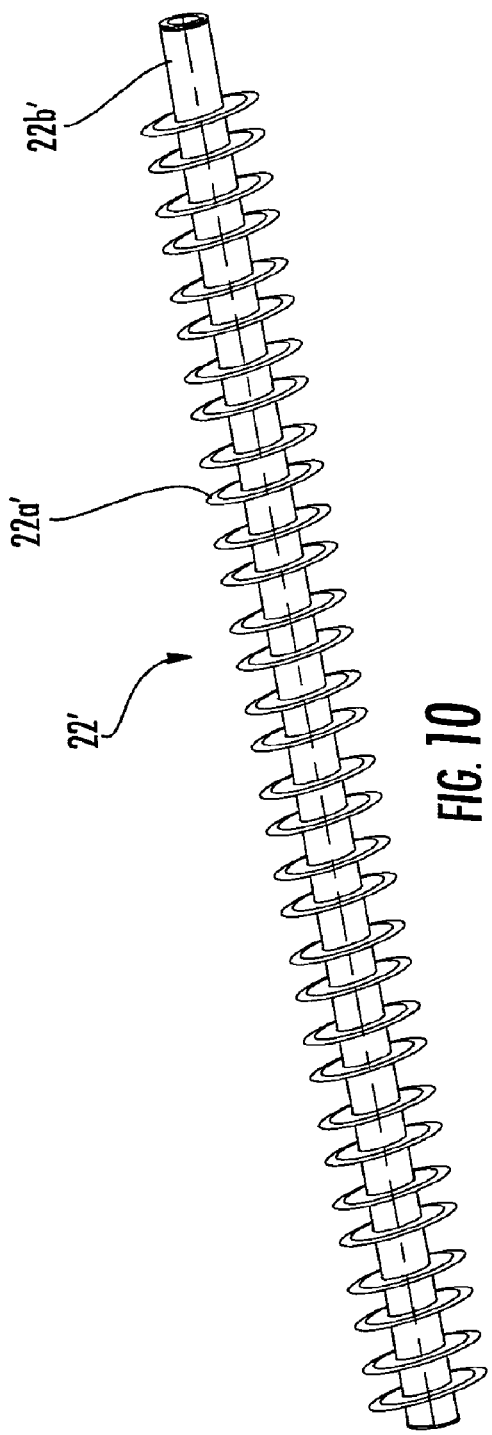
FIG. 10 is a perspective view of the cutting blades of the hopper assembly of FIGS. 8 and 9.
Figure 11:
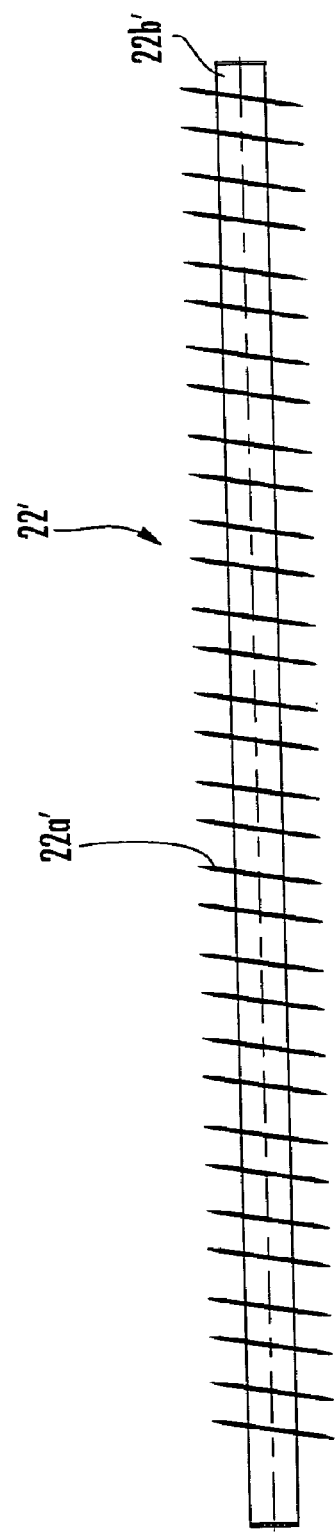
FIG. 11 is a plan view of the cutting blades of FIG. 10.

As shown in FIGS. 8 and 9, a hopper assembly 18' of the present invention may include rotatable blades 22' positioned along the hopper assembly for cutting the bags as they are pierced and suspended by the bag holders or spikes 20'. The blades 22' may comprise a plurality of discs 22*a*' spaced apart along an elongated drive shaft 22*b*', which is rotatably mounted at the hopper assembly 18' and which may be rotatably driven via a hydraulic motor 23 or other drive mechanism or device or the like. The blades or discs 22*a*' (FIGS. 8-11) may have a sharpened circumferential edge to cut into the lower portion of the bags as the bags are suspended by the bag holders and as the discs 22*a*' are rotated via rotational driving of the elongated drive shaft 22*b*' by the motor 23. The cutting discs 22*a*' may be spaced apart along the drive shaft 22*b*' a desired or appropriate amount so as to cut into the bags, preferably at multiple locations along each bag, to cause the bags to dispense their contents into the dispensing bin as the bags are supported by the bag holders 20'.

As can be seen in FIGS. 8 and 9, the bag holders 20' of hopper assembly 18' may comprise a plurality of pointed rods or spikes and may be arranged in rows along the hopper assembly to pierce and hold/support the bags at multiple locations to enhance holding of the bags while the bags are cut open by the cutting device and their contents are dispensed into the dispensing chamber or bin 18*b* of the hopper assembly 18'. The hopper assembly 18' may otherwise be substantially similar to hopper assembly 18, discussed above, such that a detailed description of the hopper assembly will not be repeated herein. The substantially common components are referenced in FIGS. 8 and 9 with the same reference numbers as used in connection with hopper assembly 18 of FIGS. 1-7. Optionally, a cover plate 26*c* may be positioned at least partially around a forward portion of spinner disc 26 to limit or substantially preclude salt or material from being spread or broadcast or thrown forwardly by the spinner disc during operation of the spreading device.

Material spreader assembly 10 may further include a limit switch or level switch 32 (FIG. 4), which may be operable to detect the level of salt or other material within the dispensing bin of the hopper assembly. When the level of material within dispensing bin 18b reaches a predetermined low level or threshold level, level switch 32 may provide or generate a signal indicative of such a low level. A control or solenoid valve or the like at power source or engine 30 and pump may then actuate the motor or motors of the bulkhead assembly 16 and/or the conveyors 28 in response to the signal to move the bulkhead 16a rearward until the next row of bags 14 are held and cut or opened and emptied into the hopper dispensing bin 18b. When the dispensing bin 18b is again filled to a desired level, the bulkhead 16a may be stopped to prevent overfilling of dispensing bin 18. The limit switch 32 may comprise on optical sensor or the like or may comprise a mechanical switch or triggering device. The switch device may thus provide an electrical signal to a control or solenoid valve at the motor 17c of bulkhead assembly 16 or at power source 30 or the like, or may provide a mechanical actuation or triggering of the movement of the bulkhead 16a or conveyor belts 28, without affecting the scope of the present invention.

The moving device or bulkhead may be operable to move the bags toward the hopper assembly a predetermined distance or amount (such as a distance representative of the width or depth of a bag of material so that a row of bags may be moved into the bag holding portion) in response to the triggering signal from the level switch, or may be operable to move the bags until a predetermined resistance is met (such as by moving the bags to the hopper assembly until the bags are pressed against the back of the holding portion and such that further movement is limited or resisted) in response to the triggering signal, or may be operable to move the bags the desired or appropriate amount in response to other settings or criteria, without affecting the scope of the present invention. The distance the bags are moved or the amount of resistance required to stop the moving device (or other limitation or criteria) may be selected depending on the types of bags and/or material that are implemented with the material dispensing device.

It is further envisioned that the cutting or opening device or devices 22 may be powered and operable to selectively cut or otherwise open the bags at the hopper in response to a triggering or actuating signal. The limit switch may then detect a low level in the dispensing bin and actuate the cutting device 22 to open the bags which may be supported at the hopper assembly by bag holders 20. The cutting device 22, when actuated, may engage the bottoms of the bags (such as via raising upward and into engagement with the bottoms of the bags) and may open the bags, thereby allowing the material in the bags to be emptied into the dispensing bin. In such an embodiment, the bulkhead may be biased or spring-loaded to push the bags of material rearward such that filled bags are moved to and positioned on the bag holders or spears after the previous row of bags are cut and emptied.

The bulkhead may be movable toward the hopper assembly via any drive means or means for moving the bulkhead and material toward the hopper assembly. For example, in one embodiment of the material spreading assembly of the present invention, the bulkhead may be powered or driven along the receiving portion or magazine, while the conveyor belts are freely movable about the rollers. Optionally, the conveyors may be driven via one or more motors or the like to move the material or bags toward the hopper. It is envisioned that the bulkhead may be attached to the conveyors to move with the driven conveyors, or may be biased or spring-loaded and thus biased toward the rear of the magazine and toward the hopper. The biased bulkhead may be pushed or moved or driven toward the front of the magazine (such as via driving or manually moving the bulkhead or driving the conveyors in that direction or via other driving or moving means) before or during loading of the magazine, and then may be biased toward the hopper to push or move the material or bags rearward as desired. Other means for moving the material or bags rearward toward and into the hopper assembly may be implemented, without affecting the scope of the present invention.

In the illustrated embodiment, the power source or system comprises a gas engine which powers a hydraulic pump, which in turn drives hydraulic motors via pressurized hydraulic fluid. The bulkhead drive system may thus comprise a hydraulic motor which drives the driven sprocket that engages the roller chain to move the bulkhead along the truck bed. The conveyor may include two or more rubber conveyor belts which may be chain driven or may be driven along with the bulkhead as the bulkhead is moved along the truck bed. The auger assembly and the spinner disc of the hopper assembly may also be rotatably driven by respective hydraulic motors that are powered by the power source, such as via connection to one or more solenoid control valves and to the hydraulic pump. Each of the motors may be selectively actuated, such as via actuation of a respective control or solenoid valve or the like to provide pressurized fluid to the motor or motors. The controls may be at the power source or may be positioned elsewhere on the vehicle, such as in the cab of the vehicle, without affecting the scope of the present invention. Optionally, however, the bulkhead, conveyor, auger and/or spinner disc may be powered or driven via any other power source or drive means, such as via electrical motors or any other power-means, without affecting the scope of the present invention.

Figure 12:
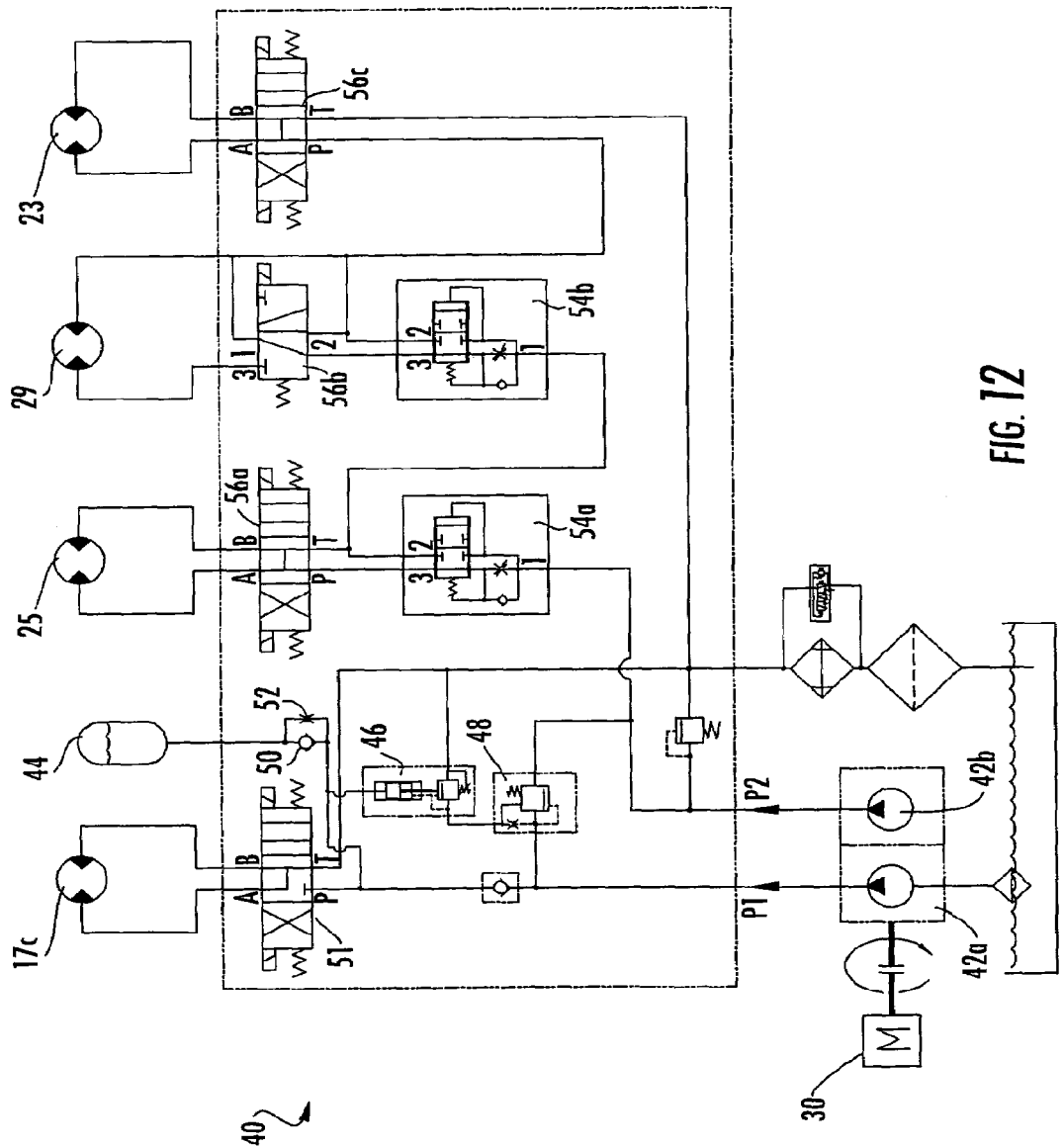
FIG. 12 is a hydraulic schematic of a hydraulic system suitable for controlling the spreading device of the present invention.

Optionally, and with reference to FIG. 12, a hydraulic system 40 is operable to move the bulkhead or push plate 16 via hydraulic motor 17c, and to operate the hydraulic motor 25 for the auger 24 and the hydraulic motor 29 for the spinner disc 26. Optionally, such as for the hopper assembly 18' of FIGS. 8 and 9, the hydraulic system 40 may also operate the rotatable cutting device 22' via hydraulic motor 23. Hydraulic system 40 includes two pumps 42a, 42b, with one pump 42a dedicated to the push plate and the other pump 42b dedicated to the hydraulic motors 25, 29 and 23 for the auger 24, spinner disc 26 and bag cutter 22', respectively (although a single pump or more than two pumps may be implemented without affecting the scope of the present invention). The pumps 42a, 42b may be powered or driven by a gas-powered engine 30 or the like. When the system is started, the push plate pump 42a may begin charging up an accumulator 44, which accumulates the pumped hydraulic fluid or oil until a desired or selected pressure within the accumulator is reached. When the accumulator pressure reaches the preselected or predetermined level, such as, for example, about 1000 p.s.i., an unloading valve 46 may shift, thus causing a regulating valve 48 to discharge or dump the hydraulic fluid or oil to the rest of the circuit or system or lines at a low pressure. A check valve 50 limits or substantially precludes the accumulator 44 from discharging the accumulated fluid back through the rest of the circuit. The fluid passing through regulating valve 48 joins with the fluid pumped by the other pump 42b to run the hydraulic motors 25, 29, 23 for the auger 24, spinner disc 26 and bag cutter 22', respectively.

The motor 17c may drive or move the push plate when a directional valve 51 is actuated to supply pressurized fluid to and through the hydraulic motor 17c. As the accumulator fluid or oil is consumed by the motor 17c of the moving push plate 16a, the pressure drops in the accumulator 44 (as the fluid is bled from the accumulator via a reduced diameter orifice 52 (such as on orifice having, for example, a 0.06 inch diameter or thereabouts). When the fluid pressure in the accumulator 44 drops a particular amount, such as when it reaches about 80% of the set pressure (such as when it reaches about 800 p.s.i. if the set pressure is about 1000 p.s.i.), the unloading valve 46 may close, thus causing regulating valve 48 to close and the accumulator 44 to recharge as fluid is pumped by pump 42a. During the recharge time, the fluid flowing into the accumulator is not available to the rest of the circuit.

The operation of the accumulator 44, unloading valve 46 and regulating valve 48 results in the pressure remaining substantially constant at the hydraulic motor 17c (such as about 800 to 1000 p.s.i. pressure at the push plate drive motor), such that the push plate 16a exerts a substantially continuous force on the salt bags. The oil from the second pump 42b plus the oil dumped from the regulating valve 48 may flow to pressure compensated flow controls 54a, 54b for the motor 25 of the auger 24, and then to the motor 29 of the spinner disc 26, and finally to the motor 23 of the bag cutter 22' (or other order or in parallel as desired). The hydraulic system 40 may include a mechanical clutch or the like (not shown) at the engine output shaft to unload the pump during startup of the engine, or may include a pump unloading valve or the like as discussed below. The system 40 further includes control valves 56a, 56b, 56c for selectively or automatically actuating or deactuating the motors 25, 29, 23, respectively. The control valves may be selectively activated to control/operate the motors, such as via a user input or control panel, which may be located at the material handling device or within the vehicle cab for operation by a user.

Figure 13:
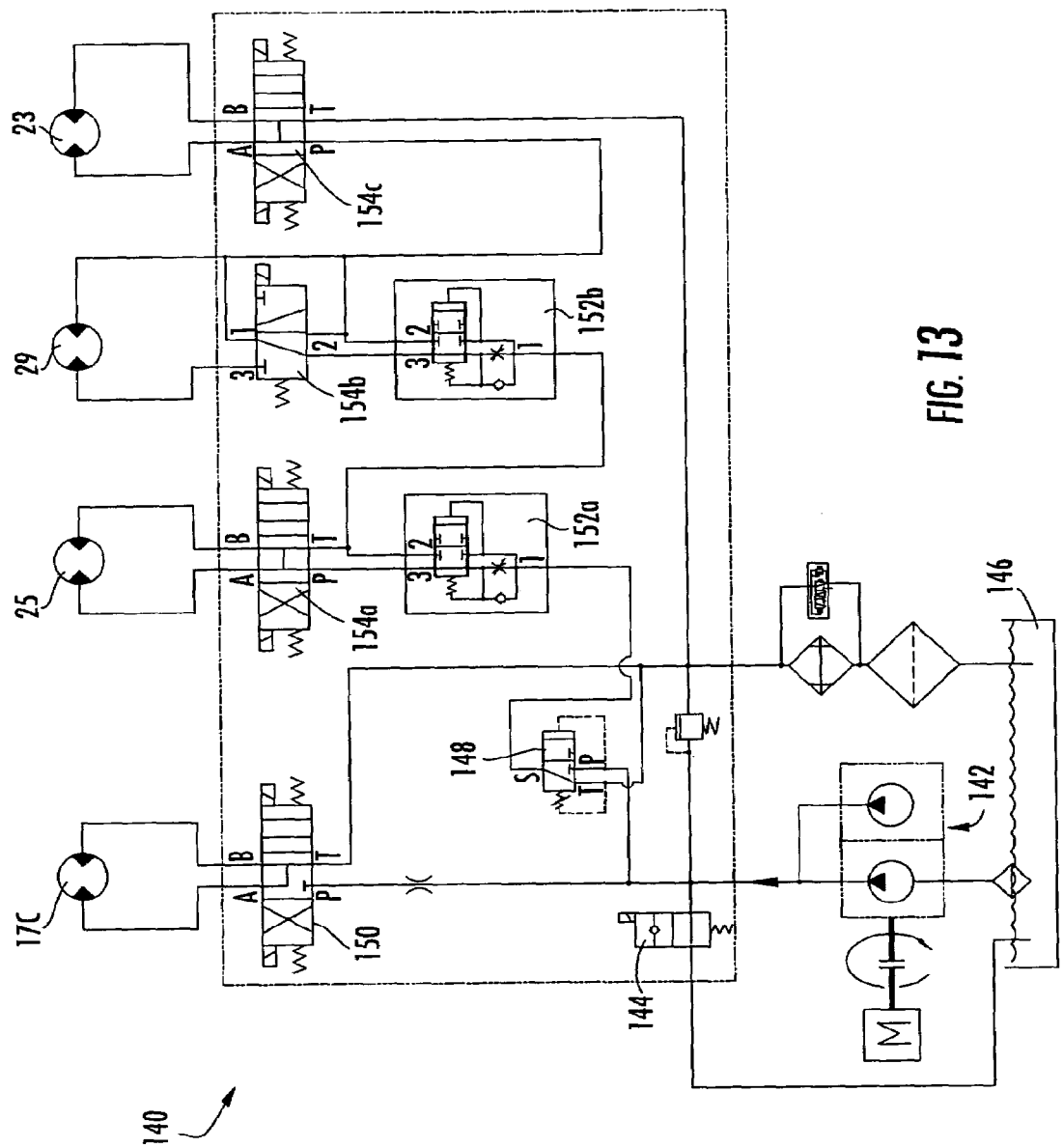
FIG. 13 is another hydraulic schematic of a hydraulic system suitable for controlling the spreading device of the present invention.

Optionally, and with reference to FIG. 13, a hydraulic system 140 is operable to move the bulkhead or push plate 16 via hydraulic motor 17c, and to operate the hydraulic motor 25 for the auger 24 and the hydraulic motor 29 for the spinner disc 26. Optionally, such as for the hopper assembly 18' of FIGS. 8 and 9, the hydraulic system 140 may also operate the rotatable cutting device 22' via hydraulic motor 23. Hydraulic system 140 includes a pump 142 (although shown as two pumps teed together, this may be a single pump, without affecting the scope of the present invention) to operate the motors 17c, 25, 29 and 23 for the push plate 16a, auger 24, spinner disc 26 and bag cutter 22', respectively. In the illustrated embodiment, hydraulic system 140 includes a pump unloading valve 144 which may be used for cold starting and may allow pump flow to circulate directly back to the reservoir or tank 146 to minimize the load on the engine when starting. After the engine is started, the pump unloading valve 144 may be closed.

Hydraulic system 140 also includes a sequence valve 148, which works similar to a relief valve. When the fluid pressure at the valve 148 reaches the valve's setting (such as, for example, about 1500 p.s.i.), the valve 148 may open and allow the fluid to dump at the valve's setting to the remainder of the circuit. As a result, the push plate valve 150 may operate at substantially a constant pressure (such as about 1500 p.s.i.) to keep a substantially constant force on the bags via the push plate. The fluid that passes through or dumps over the sequence valve 148 flows to pressure compensated flow controls 152a, 152b for the motor 25 of the auger 24, and then to the motor 29 of the spinner disc 26, and finally to the motor 23 of the bag cutter 22'.

The sequence valve 148 thus opens to allow fluid to flow to the motors 25, 29, 23 when the pressure in the fluid line to the push plate motor 17c reaches a desired or selected pressure. The sequence valve 148 then opens to relieve the pressure such that the pressure remains substantially constant in the line to the push plate motor 17c. The push plate motor 17c thus is operable at a substantially constant pressure and, thus, causes push plate 16a to exert a substantially constant force at the bags of material. The system 140 further includes control valves 154a, 154b, 154c for selectively or automatically actuating or deactuating the motors 25, 29, 23, respectively.

Both hydraulic systems 40, 140, discussed above, may provide a substantially constant pressure or force at the bulkhead or push plate to push against and move the bags in the receiving portion of the spreading device. The hydraulic system 40 may provide an efficient system, since the fluid or oil from the push plate pump is unloaded to the remainder of the circuit under essentially no pressure, but may be more expensive to implement. Alternately, the hydraulic system 140 may operate with a single pump, and includes the sequence valve, which may substantially constantly dump the oil or fluid at the sequence valve setting, thereby generating heat and inefficiencies. Other hydraulic or electric systems may be implemented to provide similar control and operation of the motors, without affecting the scope of the present invention.

Although shown and described as being used for emptying and spreading salt from salt bags, the spreader assembly of the present invention may also or otherwise be used to spread other material, which may or may not be provided in bags, such as sand, gravel, dirt or the like. For example, during summer months, the spreader assembly of the present invention may be used to spread other bagged products such as fertilizer, grass seed, topsoil, rocks, gravel, sand and/or the like. Optionally, it is envisioned that the spreading device may carry and spread bulk material, such as dirt, sand, gravel, topsoil/loam, mulch, or any other type of material which may be loaded in bulk into the bed of the truck or into the receiving portion of the spreading assembly, and pushed rearward into the hopper assembly, where it may be discharged or spread over the desired area. The conveyor belt system and/or discharge area may be slightly modified to enhance the performance of the spreading device in such an application. It is further envisioned that different or "optional" gate/hopper configurations may be offered to service these various other types of applications.

The material handling device or salt spreader of the present invention thus provides a self-contained, freestanding device that may be supported at a pickup truck bed level when not in use. When it is desired to install or attach the material spreader assembly, the operator may remove the tailgate from a truck and back the truck under the spreader assembly (which may be suspended via any mounting frame or support to provide clearance beneath the salt spreader assembly for the truck). Once in position in the truck bed, the spreader assembly may be mechanically fastened to the vehicle to prevent the device from shifting during use.

When the spreader assembly is secured in place on the vehicle, the operator may open the hopper gate (as shown in FIG. 1) to gain access to the bag receiving and storage area and may actuate or engage the conveyor motors or bulkhead motors to move or slowly move or creep the conveyor belts and/or bulkhead toward the front of the vehicle. As the conveyor belts and bulkhead move, the operator may place salt bags, first against the moving bulkhead and then against each other (or in any other order), in multiple rows until the bulkhead reaches it's full forward position. At this point, the forward movement of the conveyor and/or bulkhead may be stopped. The salt bag storage magazine may then be full or partially full and the hopper gate may be closed. After the gate is closed, the operator optionally may cut and open additional bags and pour additional salt or material into the hopper bin if additional salt or other material is desired.

When the operator is ready to begin spreading the salt or other material, the operator may actuate or engage the hopper auger (such as via actuating an appropriate control or solenoid valve), which conveys the material in the dispensing bin of the hopper assembly to the hopper discharge hole. The material may then drop or discharge onto the broadcaster or spinner disc (which also may be actuated via the operator actuating an appropriate control or solenoid valve or may be actuated in response to the actuation of the auger), which then broadcasts the material across the pavement surface or other surface or area.

When the level of material in the hopper diminishes to a predetermined amount (as may be monitored by a load level switch or optical sensor or the like), the switch or other actuator or the like may engage or actuate or trigger the bulkhead or push plate and/or the bag conveyor, which in turn functions to move or push the stacked bags back towards the hopper area. As the bags are moved toward the hopper and just as the bags are about to fall into the hopper, the bag spears or spikes pierce the bags in the rearward most row, such as around midway up the bags, thereby holding or suspending the bags above the hopper and keeping the bags from dropping into the hopper. As the bags are moved further back onto the spikes or bag holders, the bag bottoms may be slit or cut or torn or otherwise opened with knives or blades or the like, allowing the material in the suspended bags to drop into the hopper bin. When the hopper bin reaches a "full" level, the load level switch or the like may turn the bulkhead and/or bag conveyor off to stop rearward movement of the bags in the truck bed. This process may be automatically repeated until all the bags in the truck bed have been pushed across the slitting knives or blades or the like, the material dropped and spread, and the empty bags collected on the bag holders or spears. When the bag magazine or receiving portion is empty, the operator can swing the hopper open and easily remove the empty bags from the bag spears.

In the illustrated embodiment, the salt spreader assembly allows for up to approximately forty-four (44) fifty (50) pound-bags of salt to be stored in the magazine or receiving portion, and the contents of an additional sixteen bags or thereabouts may be poured loose in the hopper bin. This translates to approximately 33 cubic feet or 2200 lbs. of bagged salt and approximately 12 cubic feet or 800 lbs. of loose salt. Therefore, the spreader may hold approximately 45 cubic feet or approximately 3000 lbs. of salt. The salt spreader of the present invention thus has a 1.66 cubic yard capacity, which is in the range of many conventional vee box spreaders. Although shown and described as holding, cutting and emptying bags of material, clearly the term "bags" is meant to encompass paper bags, plastic bags, and other containers or bins, such as boxes and cartons and the like, which are used to hold or contain salt or other material which may be desired to be spread over a targeted area by the spreader assembly of the present invention.

The present invention thus provides a material spreading assembly for a pickup truck which provides a capacity that is approximately 4½ times greater than conventional tailgate spreaders, thereby reducing the amount of down time required to refill the hopper. The spreader magazine may be loaded from the ground level, and avoids the need to climb up into the truck bed, thus reducing potential injury due to slips or falls. The spreader design of the present invention also allows contractors without storage and loading equipment to handle and spread bagged salt with optimum efficiency. The empty bags are collected automatically by the bag holders or spikes at the hopper assembly and held securely until disposed of after the job is completed. Also, the present invention provides a low profile spreader assembly, which gives the operator of the vehicle an unobstructed rearward field of view during use of the spreader assembly. The spreader assembly may be easily installed and removed from the truck bed without the need of lifting equipment. The spreader assembly may be left in the vehicle when not in use (empty and with or without the hopper assembly attached to the receiving portion), yet the vehicle may still provide carrying capacity of miscellaneous cargo.

Figure 14:
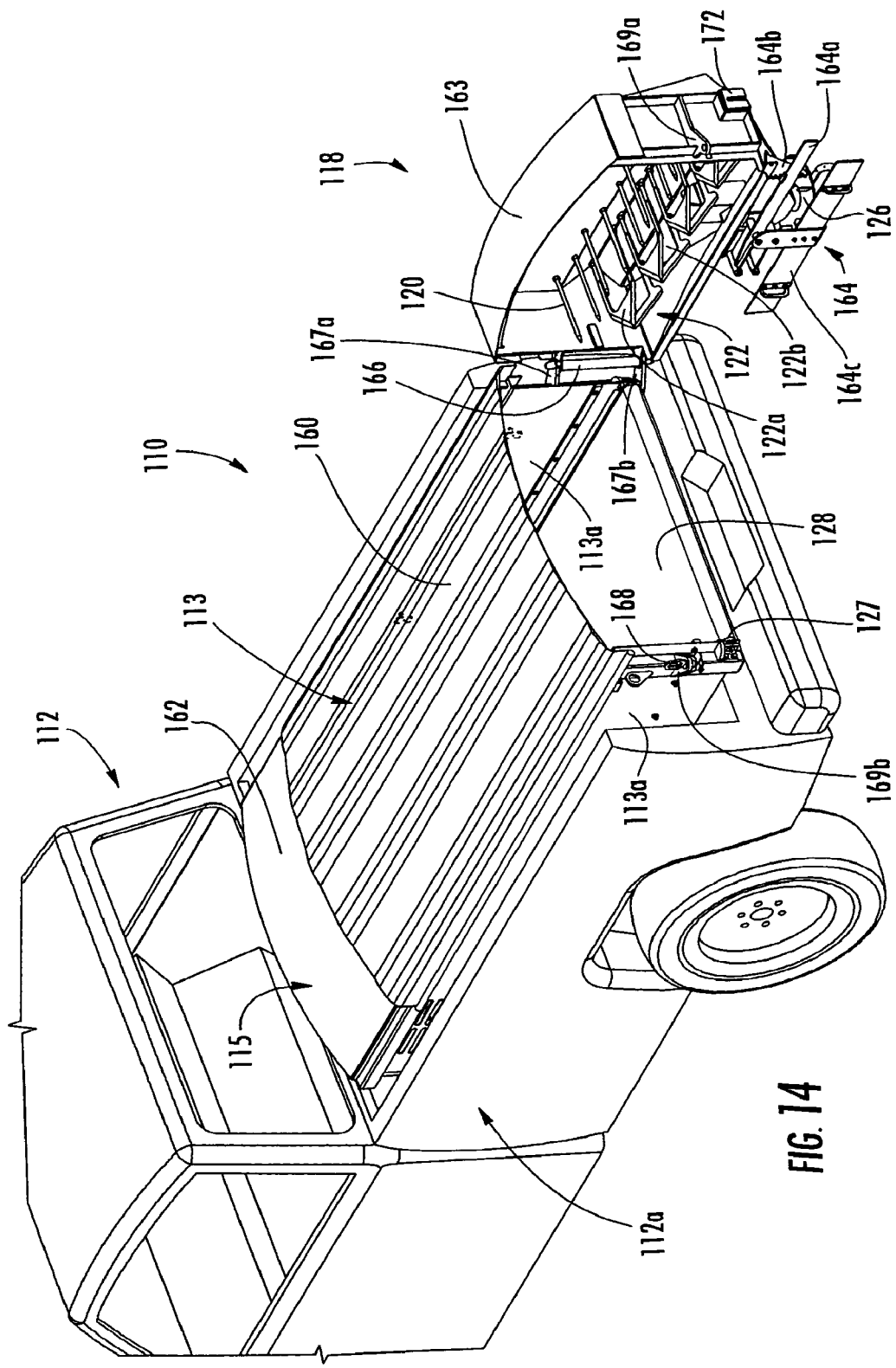
FIG. 14 is an upper perspective view of a rear portion of a vehicle having a material handling or spreading assembly or device in accordance with the present invention.
Figure 15:
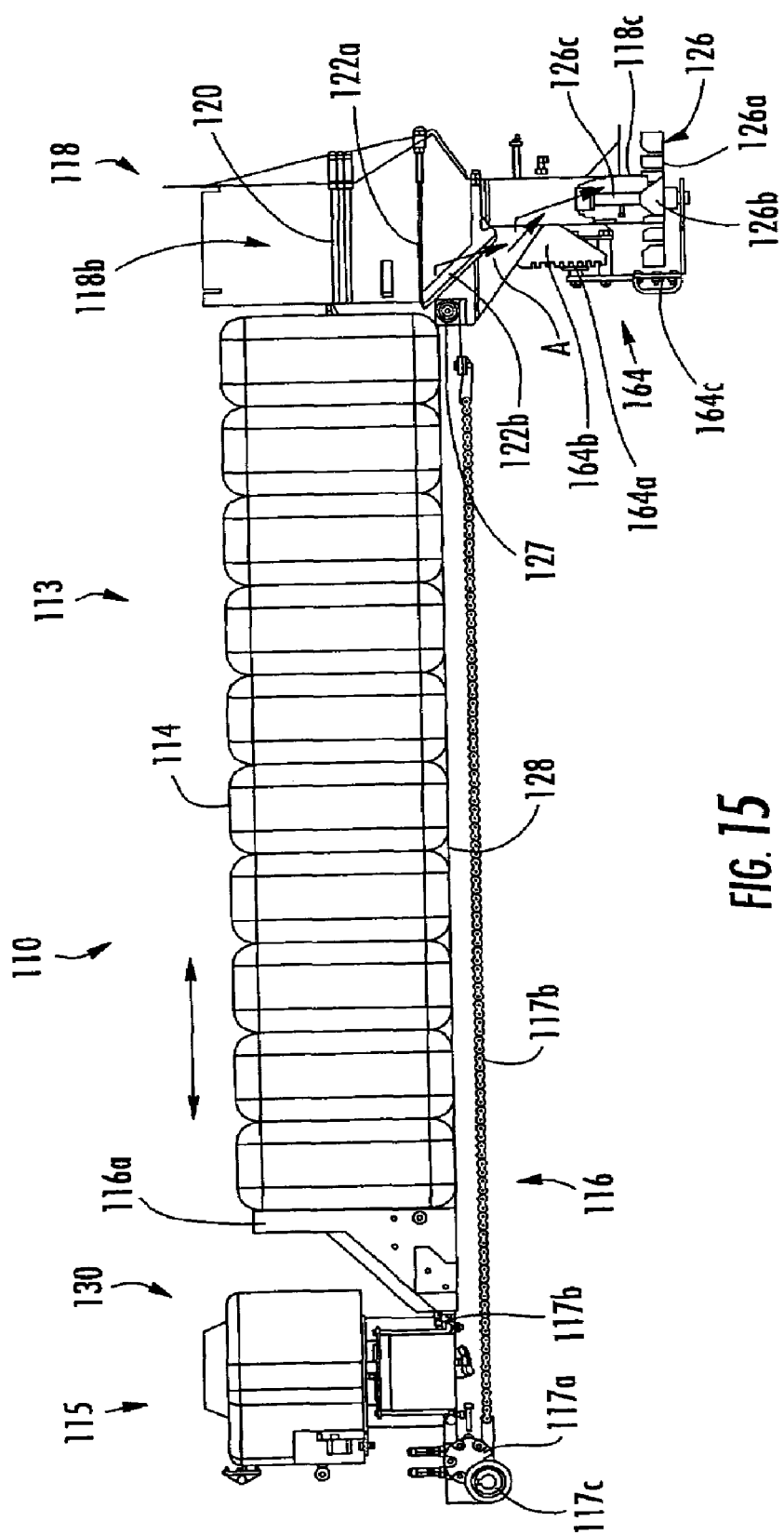
FIG. 15 is a side elevation and partial sectional view of the material spreading device of FIG. 14.

Optionally, and with reference to FIGS. 14 and 15, a material handling device or assembly or system or material spreading device or assembly or salt spreading device or assembly 110 is positionable within a bed portion 112a of a vehicle 112 and is operable to dispense and spread salt or other material therefrom, such as in a similar manner as described above. Material handling device 110 includes a material receiving portion or magazine 113, which is positionable in the vehicle bed portion 112a and is configured to receive and hold containers or bags 114 (FIG. 15) of salt or other material or other non-bagged or bulk material. An engine compartment or power source compartment or portion 115 is located at the forward end of material receiving portion 113 to provide power to the motors of the material handling device, as discussed below. Material handling device 110 includes a material moving or pushing device 116, which is movable along the receiving portion 113 to push the bags toward a material processing device or hopper assembly 118 positioned at the rear of the receiving portion 113. Material processing device 118 is operable to empty the material from the bags and to spread the material over the targeted area.

In the illustrated embodiment, material processing device 118 includes a plurality of bag holders or spikes or spears or members 120 for piercing the rear most row of bags at the hopper and for supporting and retaining the pierced bags while bag openers 122 open the bags for dispensing the material into the hopper dispensing bin, such as in a similar manner as described above. The material processing device 118 may further include a hopper dispensing device for moving the material to a discharge opening or hole in the hopper bin, whereby the material may be spread or broadcast by a spinner disc 126 or the like, such as discussed above. Material handling device 110 may be substantially similar to spreader assembly 10 discussed above, such that a detailed discussion of the spreader assemblies need not be included herein.

As can be seen in FIGS. 14 and 15, bag openers 122 may comprise generally T-shaped knives or blades or the like, slice, cut or tear or otherwise open the bags at the bottom portion of the bags to allow the material within the bags to be deposited into the hopper dispensing bin, as discussed below. The T-shaped bag openers 122 include a generally horizontal upper blade 122a that is angled at either side so that a generally central point of the blade protrudes toward the receiving portion for puncturing and slicing the bags as the bags are received at the material processing device 118. T-shaped bag openers 122 also include a generally vertical lower blade 122b that extends downward from a central region of the upper blade 122a and is also angled or tapered to provide an angled blade extending downwardly and rearwardly from the generally central point. Thus, the T-shaped bag openers puncture and slice into the bags and create a substantial opening in the bag to dispense the material from the bag in a rapid manner. The blades 122a, 122b are angled or tapered so that the blades pierce and cut or slice the bags to enlarge the opening in the bags as the bags are moved further rearward onto the support spikes 120. As shown in FIG. 15, the material may flow (see the arrows A in FIG. 15) from the bags from a level near the slicing blades 122a, 122b of bag openers 122 downward and rearwardly into the collecting portion or region or material dispensing chamber or bin 118b at a lower portion of the hopper assembly or material processing device 118, where the material is further dispensed downward onto the dispensing element or spinner disc 126.

As can be seen in FIG. 14, material handling device 110 may include a cover or lid element 160 that is attachable or removably attachable to an upper region of the sidewalls 113a of receiving portion 113 to substantially cover the compartment of the receiving portion to protect and cover the salt bags or other material that may be disposed at the receiving portion. The engine compartment or area 115 of the material handling device 110 may also include a cover or lid element 162 to cover and protect the power supply or source or engine and bulkhead drive system and the like at the forward end of the material handling device 110. Likewise, the material processing device 118 may also include a cover element 163, whereby the shape and curvature of the cover elements 160, 162 and 163 may generally correspond to one another so as to form a generally continuous cover along the material handling device or assembly or system. The cover element or elements may comprise a substantially rigid cover material, such as a metallic or plastic or polymeric material or the like, or may comprise a flexible or cloth-like material or tarp supported via a plurality of ribs or support elements extending longitudinally along and/or laterally across the receiving portion. The material handling device 110 thus is a self-contained, covered assembly that may be readily installed or positioned as a unit in or at the pickup truck bed or other vehicle bed or platform or the like for use, and may be readily removed therefrom as desired, such as described below.

As shown in FIG. 15, material handling device 110 includes a power source or power means 130, such as a gas powered engine and hydraulic pump or the like, at the engine compartment 115 at the forward end of receiving portion 113. Power source 130 is operable to provide pressurized fluid to one or more hydraulic motors which are operable to drive or control various components of material handling device 110, such as a drive motor of the material moving device 116 and/or one or more motors or devices of the material processing device 118.

In the illustrated embodiment of FIG. 15, material moving or pushing device 116 comprises a generally vertical wall portion or bulkhead or push plate 116a, which is movable along the length of the receiving portion 113 to push the bags of material toward the rear of the vehicle and thus toward the material processing device or hopper assembly 118. The bulkhead 116a extends at least substantially across the receiving portion 113 and between the side walls 113a of receiving portion 113. Bulkhead 116a is attached at its rearward or pushing face or portion to a conveyor belt 128 that extends along the floor of the receiving portion 113 when bulkhead 116a is at its forward or retracted position as shown in FIG. 15. Conveyor 128 and bulkhead 116a are movable along the receiving portion 113 via at least one rotatably driven gear or drive member 117a which may rotatably and drivably engage a chain or track or the like 117b extending along the receiving portion 113 and generally underneath the floor of the receiving portion when the bulkhead is at its forward or retracted position. In the illustrated embodiment, a hydraulic drive motor 117c rotatably drives drive member 117a to move the chain 117b in either direction, as discussed below.

The chain or track 117b may be positioned along a lower portion of the receiving portion 113, with the drive member or members 117a rotatably engaging the chain or chains 117b to guide and/or drive the bulkhead 116a along the receiving portion 113. Receiving portion 113 includes a roller or rollers 127 extending across the receiving portion and at a rearward end or region thereof. The conveyor belt or belts 128 is reeved around roller 127 and connected to drive chain 117b, whereby movement of chain 117b via drive member 117a imparts a corresponding movement of conveyor belt 128 along the receiving portion 113. As can be seen in FIG. 15, one end of the chain 117b is connected to an end of the conveyor belt, while the other end of the chain is connected to the forward side or portion of the movable bulkhead 116a, such that a continuous loop is formed via the chain, the conveyor belt and the bulkhead. Accordingly, as drive member 117a rotates (such as in a clockwise direction in FIG. 15) to move or pull drive chain 117b, the conveyor belt 128 is moved along the receiving portion and around the roller 127, and the bulkhead 116a is moved toward the rear of the receiving portion 113 to move the material in the receiving portion toward the rear of the receiving portion 113 and toward and into engagement with the material processing device 118. Movement or rotation of the drive member in the opposite direction (such as in a counterclockwise direction in FIG. 15) pulls movable bulkhead 116a forwardly to retract the bulkhead to the forward portion of the receiving portion, such as for loading material or bags of material into the receiving portion. The drivable gear member 117a may be rotatably driven by a hydraulic motor 117c or the like, and the motor or motors may be powered or driven via the power source 130, such as a gas powered engine and hydraulic pump and control valves, or other suitable power means.

In the illustrated embodiment of FIGS. 14 and 15, material processing device 118 comprises a hopper assembly and spreading assembly or device, which is operable to open bags of salt or other material and dispense the contents of the bags at the ground or area immediately at or near the rear of the pickup truck or vehicle, such as in a similar manner as described above with respect to spreading device 18. Because the material processing device 118 may be substantially similar to spreading device 18 discussed above, a detailed discussion of the devices will not be repeated herein.

Material processing device 118 includes the collecting portion or region or material dispensing chamber or bin 118b at a lower portion of the material processing device 118 for collecting the salt or other material as it is deposited or emptied from the held or suspended bags 114 or from the receiving portion itself. The material processing device 118 may include an auger device or other material moving or dispensing device (not shown in FIGS. 14 and 15) positioned along at dispensing bin 118b and operable to move or guide the material within the dispensing bin toward the center portion of the dispensing bin, such as in the manner described above. The dispensing bin includes a discharge tube or conduit 118c with a drain opening or discharge opening or hole for the salt or other material to discharge therethrough.

The material processing device 118 may include a discharge rate adjustment device or assembly 164 for adjusting a flow rate of material through the hopper discharge opening and onto the spinner disc. In the illustrated embodiment, the adjustment device 164 includes a pivotable lever 164a that is pivotable about a generally horizontal axis and pivotable to raise and lower the spinner disc 126 relative to the hopper 118b and discharge conduit 118c to adjust the size of the discharge opening to control or adjust the rate of flow of material through the opening to the spinner disc.

As can be seen with reference to FIG. 15, spinner disc 126 includes a cone-shaped or conical element 126b that protrudes upwardly from the center region of the disc portion 126a. The conical element 126b is sized and shaped to at least partially fit within and thus at least partially block the discharge opening of discharge conduit 118c (the conical element is shown in FIG. 15 as partially received in the discharge conduit, which is shown with a wall portion cut-away to show additional details). Thus, vertical movement of spinner disc 126 (which may be rotatably mounted to or attached to the material processing device via a telescoping pivot axle or rod 126c) moves the conical element toward or away from the discharge opening to adjust material flow therethrough. For example, if spinner disc 126 were raised upwardly from the position shown in FIG. 15, the conical element 126b would move toward and partially into the discharge conduit 118c, thereby at least partially blocking the discharge opening and reducing or limiting the flow of material through the discharge opening. Lowering of the spinner disc and conical element likewise functions to effectively enlarge or open the opening to increase material flow therethrough.

In the illustrated embodiment, the spinner disc 126 is raisable and lowerable relative to the discharge conduit 118c via movement of the lever 164a, while the lever 164a is securable or retainable at a desired angle (and thus the position of the spinner disc and conical element are retained at the desired position to retain the effective size of the discharge opening at a desired size) via engagement with a notched plate or element 164b. As can be seen with reference to FIGS. 14 and 15, a lower support or adjustment element 164c is attached to lever 164a, whereby pivotal movement of lever 164a causes a generally vertical movement of adjustment element 164c. Adjustment element 164c is attached to a lower portion of spinner disc 126 such that vertical movement of adjustment element 164c raises or lowers spinner disc 126 (which causes retraction or extension of the telescoping pivot axle or rod 126c). Such vertical movement of the spinner disc thus effectively adjusts a size of the dispensing opening to control/adjust material flow to the spinner disc. Spinner disc 126 may be rotatably driven at a desired speed by a hydraulic motor, which may in turn be powered or driven by power source 130.

Material processing device 118 is pivotally mounted at the rear end of one of the side walls 113a at the rear of the receiving portion 113, such as via a hinge type mounting arrangement or the like, in order to allow the material processing device 118 to be opened sidewardly (as shown in FIG. 14). For example, material processing device 118 may be pivotally mounted at one side via a pivot pin or axle 166 (which may be attachable to brackets 167a, 167b at the rear of receiving portion 113), and may be latchable or securable at the other side of the receiving portion 113 via a locking pin 168 or the like. In the illustrated embodiment, the locking pin 168 is insertable through an aperture in a bracket 169a at material processing device 118 and an aperture through a bracket 169b at receiving portion 113, so as to retain the brackets 169a, 169b relative to one another and, thus, to retain the material processing device in the closed position. The locking pin 168 may be manually inserted through the apertures or may be spring-loaded or otherwise biased toward the inserted position, whereby a person opening the material processing device may pull upward (or downward or in another direction depending on the orientation of the pin) to release the pin from one or both of the apertures to allow for opening of the material processing device.

For example, the locking pin may be movably attached to and spring-loaded or biased at bracket 269a, which may comprise a pair of vertically spaced apart flanges for receiving bracket 169b therebetween. Locking pin 168 may be pulled upward to disengage the locking pin from the lower flange (and from the bracket 169b if the material processing device is in the closed or in-use position) to facilitate opening or closing of the material processing device, and then released, whereby the locking pin may be biased downward and through the aperture in the lower flange (and through the bracket 169b if the material processing device is in the closed position) to retain the locking pin in the locked or retaining position. Thus, the material processing device may be opened or swung or pivoted outwardly (such as shown in FIG. 14) to ease loading of the receiving portion 113 with the bags of salt or other material, and may be closed and latched or pinned in the closed position when the receiving portion is filled or loaded and the material handling device is ready for operation.

Preferably, the hydraulic motor or motors (or other motors or power sources) of the material processing device are connected to power source 130 (and associated fluid ports and/or solenoid control valves) at the engine compartment 115 at the forward end of the receiving portion 113, such as via hydraulic lines or pipes or other power supply lines or connections extending along the receiving portion. The lines or pipes of the motor or motors at the material processing device may connect to the lines or pipes of the receiving portion, such as generally at the pivot or hinge side of the material processing device and receiving portion. Preferably, the connections between the lines or pipes of the receiving portion and the material processing device may be quick-connect type connectors or the like, so as to ease the connection and disconnection of the lines or pipes when attaching or removing the material processing device at the receiving portion.

Optionally, and preferably, the material handling device 110 may be readily configurable or adaptable for different applications besides spreading material at the rear area of a pickup truck (or other vehicle). For example, the spreader disc-type material processing device 118 may be removed such as by removing one or more pins or bolts at the pivot axle 166 to allow for removal of the material processing device from the rear portion of the receiving portion 113. The hydraulic lines or other power supply lines or connections of the material processing device may be disconnected from the corresponding lines or pipes or connections of the receiving portion at the hinge area to disconnect the power supply to the material processing device to allow for removal of the material processing device from the receiving portion.

After the material processing device 118 is removed from the receiving portion 113, a different material processing device may be selected and attached to the receiving portion in a similar manner as the material processing device 118, and may be connected to the power source in a similar manner as the material processing device 118. For example, other types of dispensing devices or cleaning devices or vacuuming devices or chipper/shredder devices (such as those described below) and/or the like may be selectively attached to the rear of the receiving portion to provide the desired function or feature at the material handling system.

Figure 16A:
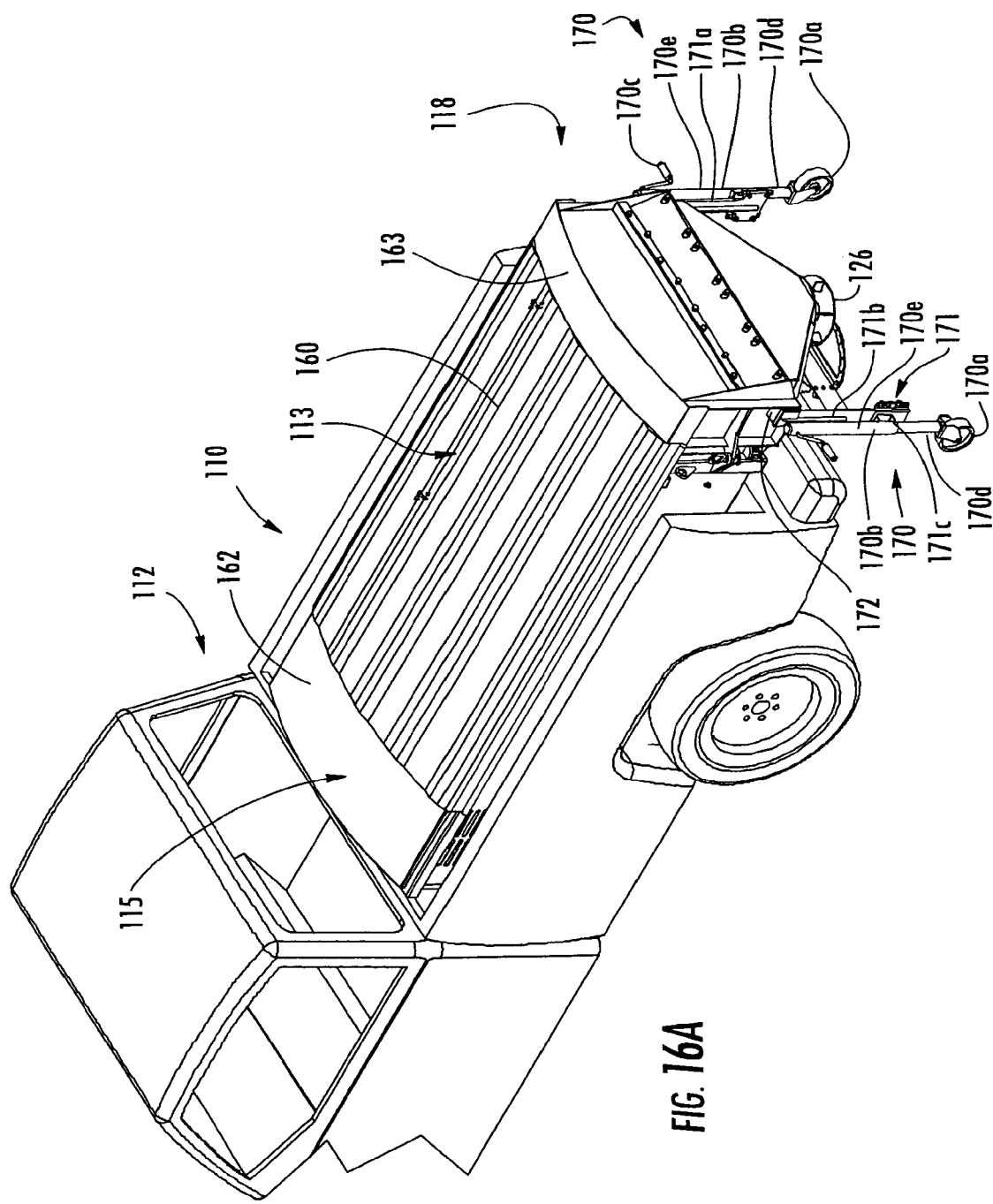
Figure 16B:
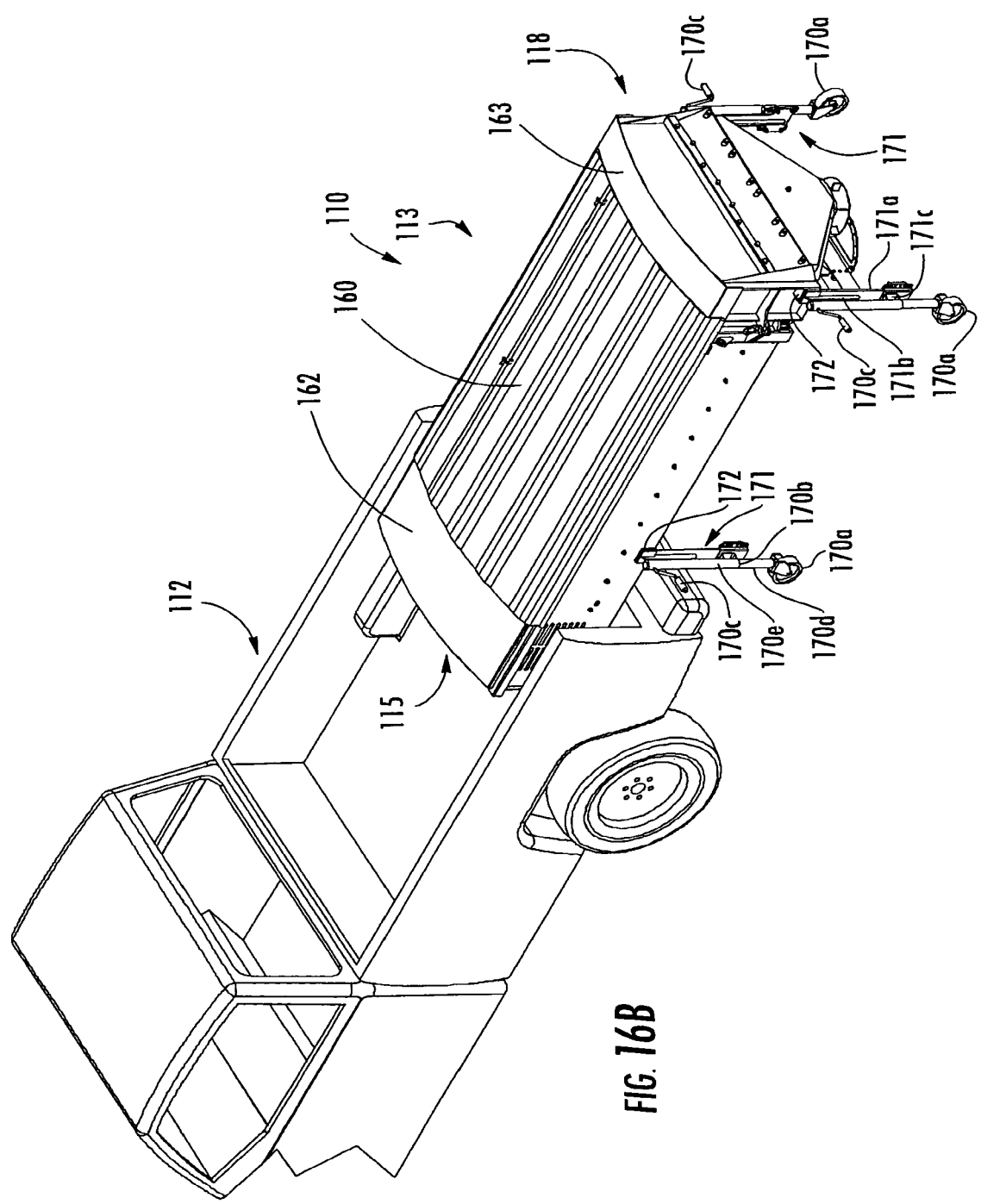

Optionally, the self-contained material handling assembly or device or system of the present invention may be readily inserted or installed or positioned in or at a bed of a vehicle for use and may be readily removed therefrom when not in use. For example, and with reference to FIGS. 16A-C, material handling system or assembly or device 110 may include a plurality of wheel assemblies 170 that are attachable to or at the side regions of the device and that function to movably support the material handling device at the ground or support surface when the material handling device is at least partially removed from the vehicle bed. In the illustrated embodiment, each wheel assembly 170 includes a wheel 170a that is rotatably mounted at a lower end of a leg or support member 170b that extends downward from the receiving portion 113 or the material processing device 118. As shown in FIGS. 16A-C, support members 170b may be attached to or partially received at or otherwise mounted to a wheel mounting bracket or receiver 172 at the receiving portion or material processing device. In the illustrated embodiment, a wheel mounting bracket 172 is located at each side of the material processing device 118, while a wheel mounting bracket is also located at each side of the receiving portion 113, and toward a forward end thereof (as shown in FIGS. 16B and 16C) so as to provide support at or near each corner of the material handling device when the material handling device is removed from the vehicle. The position of the wheel mounting brackets and wheel assemblies may be selected along the engine compartment 115, the receiving portion 113 and the material processing device 118 (and/or may be at the forward end of the engine compartment and/or the rearward end of the material processing device) to provide the desired or appropriate support and balance of the material handling device when it is removed from the vehicle, and thus the position of the wheel mounting brackets and wheel assemblies may vary depending on the particular application of the material handling device or system.

The wheel assemblies may be attached to the material handling device as it is removed or partially removed from the vehicle bed, such as by inserting or attaching the support members into a respective slot or bracket of the receiving portion or material processing device (as shown in FIGS. 16A-C), or the wheel assemblies may be pivotally mounted to the receiving portion and/or material processing device and may be pivotable between a storage or non-use position, where the support member and wheel are positioned generally along the respective side of the material handling device when the material handling device is slid into or onto the vehicle bed, and a lowered or in-use position, where the support member extends downward from the material handling device to support the material handling device at the ground or support surface when the material handling device is at least partially removed from the vehicle.

Preferably, and as shown in FIGS. 16A-C, the support members 170b comprise adjustable support members that are adjustable in length so as to extend/retract to a desired length so that the wheel assemblies are adjusted to support the material handling device as the device is slid out of and removed from the vehicle bed. In the illustrated embodiment, the adjustable support member is adjustable via adjustment of a user input or crank handle 170c, which may be turned or cranked or moved by a user to cause extension and retraction of an inner support member 170d relative to an outer support member 170e in a telescoping manner, such as in a manner known in the art of boat trailer supports and the like. The degree of extension of the support members thus may be initially set to provide sufficient clearance to install or insert the support member into the respective bracket or receiver, and then the support members may be extended until they generally contact the ground or support surface to at least partially support the respective portion of the material handling device as it is slid or removed from the vehicle bed. Preferably, the support members also provide for pivotal movement of the wheels about a generally vertical axis so that the material handling device is maneuverable along the support surface when removed from the vehicle bed.

The mounting arrangement of the wheel assemblies to the receiving portion and/or to the material processing device may comprise any suitable mounting means. For example, and as shown in FIGS. 16A-C, a mounting member or element 171 of wheel assembly 170 may include a generally planar elongated element 171a with a guide or rib or spacing element 171b extending at least partially therealong. The upper and outer support member 170e is attached to elongated element 171a and is spaced therefrom by attachment at or near its upper end to rib 171b, and may be further attached to the elongated element 171a at or near a lower end of the outer support member 170e via a lower attaching element 171c extending from elongated element 171a. The elongated element 171a is received in a cavity or receiving portion of bracket 172, while the rib 171b is received along a slot in the bracket 172 to substantially fixedly secure the wheel assembly to the bracket. The mounting element 171 may be retained or secured at the bracket via any suitable means, such as a retaining pin or the like, or may be frictionally retained therein, whereby the weight of the receiving portion and material processing device at the upper end of the wheel assemblies will limit or substantially preclude dislodgement of the mounting elements 171 from the brackets 172.

Optionally, and as shown in FIGS. 16C and 16D, the material handling device 110 may include one or more rollers or wheels 174 rotatably mounted at a forward end of the receiving portion 113 for easing insertion and removal of the material handling device along the surface or floor of the vehicle bed. In the illustrated embodiment, the material handling device 110 includes a wheel 174 rotatably mounted via a pivot axle or pin or bolt 174a at each lower forward corner of the engine compartment of the receiving portion. Thus, the wheels 174 may movably or rollingly support the forward end of the material handling device as it is slid into or out from the vehicle bed so as to ease insertion and removal of the material handling device relative to the vehicle bed.

Accordingly, material handling device 110 may be readily inserted into and retracted or removed from the vehicle bed without having to lift and carry the material handling device. In order to install the material handling device at the vehicle, the height of the material handling device may be adjusted via the adjustable support members until the forward end of the material handling device is generally at or above the level of the vehicle bed. The material handling device may then be moved at least partially into or onto the vehicle bed whereby the forward wheels 174 may rollingly engage the vehicle bed and movably support the forward portion of the material handling device at the vehicle bed. As the material handling device is further moved into the vehicle bed, the forward wheel assemblies 170 may be adjusted or shortened (so that the wheels are spaced from the ground and thus may be moved downwardly out from the brackets 172) and removed from their brackets 172 (or pivoted to the non-use position), and the material handling device may be moved further into or onto the vehicle bed. When the material handling device is substantially into or onto the vehicle bed, the rearward wheel assemblies may be adjusted or shortened and removed from their brackets (or pivoted to the non-use position), whereby the material handling device may be fully inserted or positioned into or onto the vehicle bed and secured thereto and whereby the motor or motors of the material processing device (if applicable) may be connected to the appropriate electrical or hydraulic or mechanical connectors at the receiving portion so as to provide power and control to the motor or motors of the material processing device. When removing the material handling device from the vehicle, the process above is performed in a generally reverse manner to provide support of the rearward portion of the material handling device at a desired or appropriate level or height as the material handling device is pulled from or retracted or removed from the vehicle bed.

Thus, the material handling device of the present invention may be readily inserted into or positioned at a vehicle bed and may be readily removed from the vehicle bed when not in use. Although shown as having a forward set of wheel assemblies attachable to or extendable from opposite sides of the receiving portion and a rearward set of wheel assemblies attachable to or extendable from opposite sides of the material processing device, it is envisioned that the four wheel assemblies may attach to or extend from a respective side and/or corner region of the receiving portion, such that the material handling device may be removable from the vehicle and supportable when outside the vehicle, regardless of what material processing device or lift gate or the like is attached to the receiving portion. Optionally, one or more wheel assemblies may be mounted at the rear panel of the material processing device, such as described below.

Figure 17A:
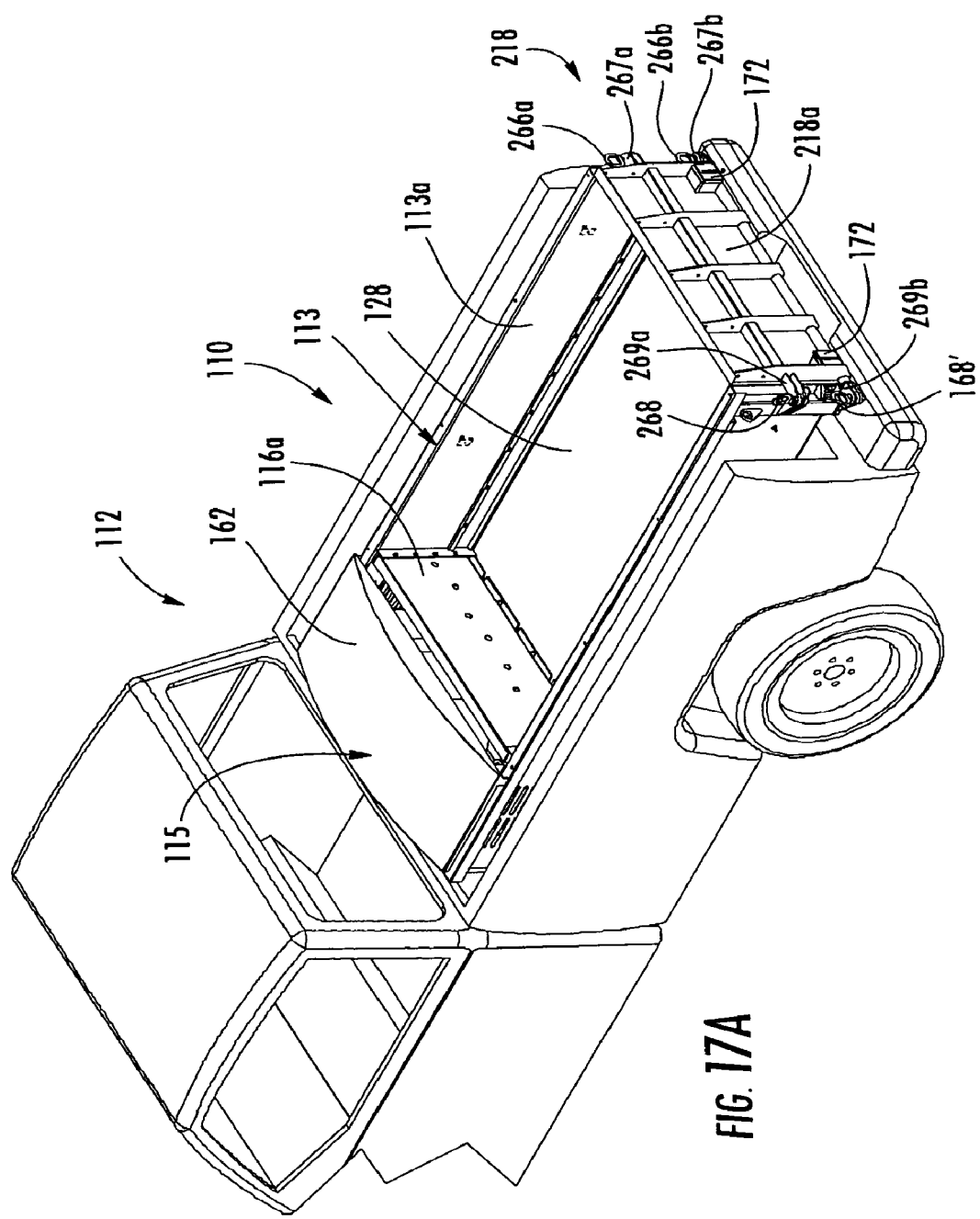
FIG. 17A is an upper perspective view of a rear portion of a vehicle having a material handling device in accordance with the present invention, shown without a spreading device at the rear of the vehicle and with a rear gate at the end of the material handling device.

Optionally, the material handling device or system 110 may have a material processing device or tailgate or door assembly 218 (FIGS. 17A-C), which is selectively attached to the rear of the receiving portion 113 to selectively close off the rear of the receiving portion as desired. The gate assembly 218 includes a door or gate panel 218*a*, which may be pivotally mounted to the receiving portion 113, such as about a generally vertical pivot axis via a pair of brackets 267*a*, 267*b* of gate assembly 218 pivotally attaching to brackets 167*a*, 167*b* of receiving portion 113, such as via a pair of pivot pins 266*a*, 266*b* or the like. The gate panel 218*a* thus may be swung open or pivoted open about the generally vertical pivot axis to the open position shown in FIG. 17B. As can be seen in FIG. 17A, gate assembly 218 may include one or more wheel mounting brackets 172 at a rearward surface of gate panel 218*a* for mounting one or more wheel assemblies thereto, in order to support the material handling device when it is removed or partially removed from the vehicle bed, such as in a similar manner as discussed above with respect to FIGS. 16A-C.

Figure 17B:
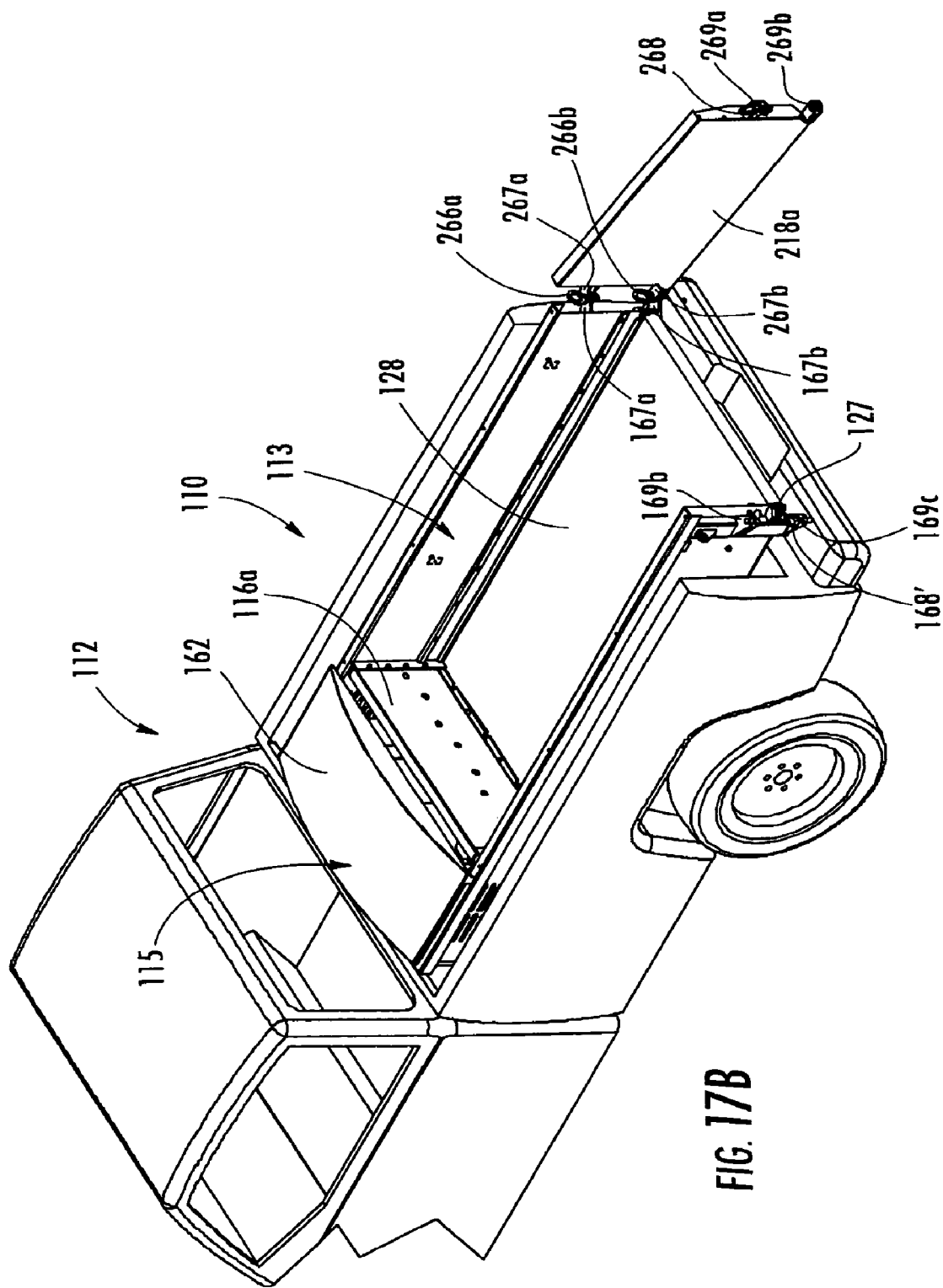
FIG. 17B is another upper perspective view of the vehicle and material handling device of FIG. 17A, with the rear gate opened sidewardly.
Figure 17C:
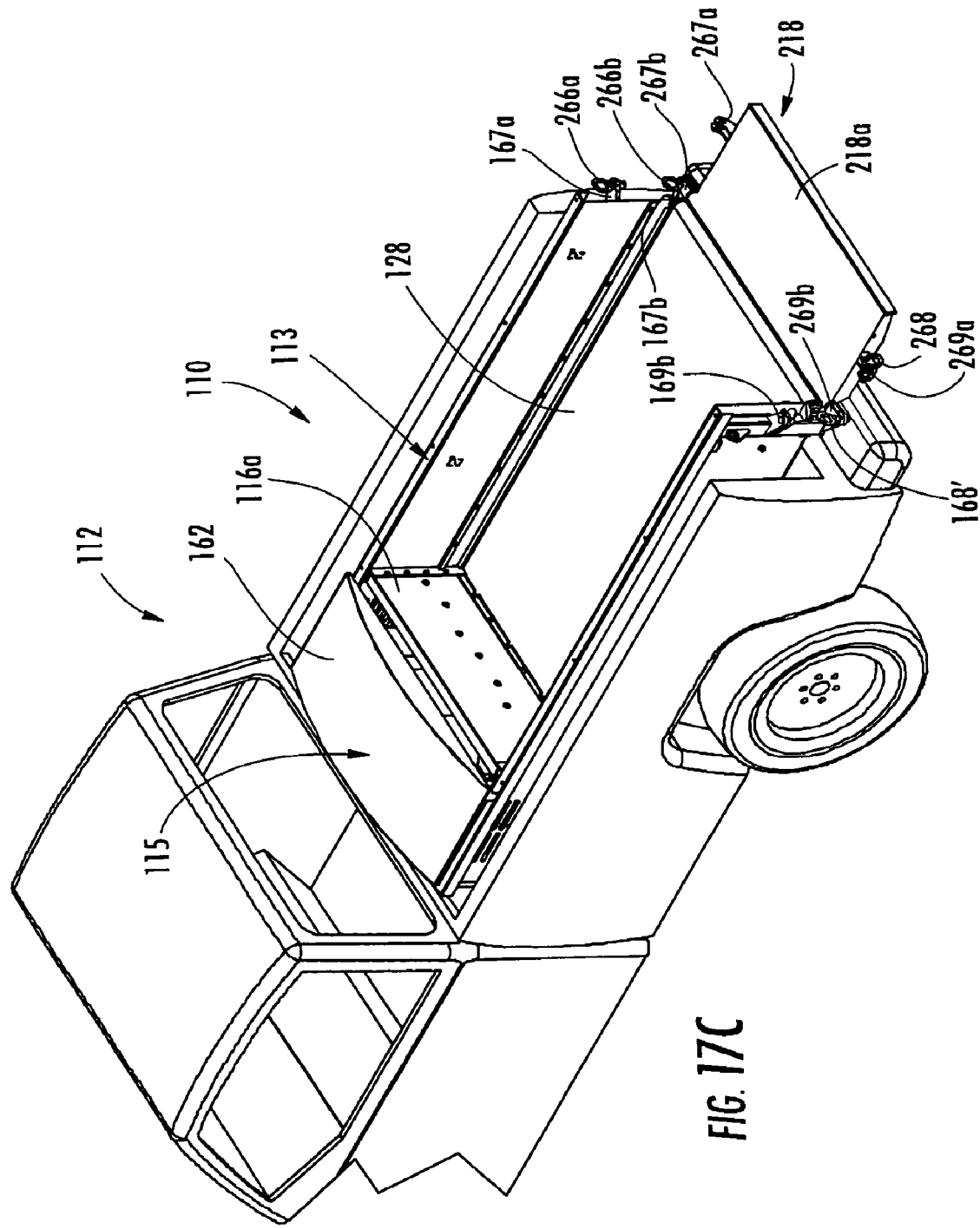
FIG. 17C is another upper perspective view of the vehicle and material handling device of FIG. 17A, with the rear gate opened downwardly.

Optionally, and desirably, gate panel 218*a* is also selectively pivotable relative to receiving portion 113 about either a generally vertical pivot axis or a generally horizontal pivot axis, so that the door or gate may be opened in either of two manners, such as can be seen in FIGS. 17B and 17C. In the illustrated embodiment, gate assembly 218 includes a latching bracket 269*a* (such as a bracket similar to bracket 169*a* of material processing device 118), which is latchable or securable to bracket 169*b* of receiving portion 113 via locking pin 268 (such as a locking pin similar to locking pin 168 described above with respect to material processing device 118) and a lower bracket 269*b*, which is attachable or securable to a lower bracket 169*c* of receiving portion 113, such as via a second locking pin 168' or the like. As can be seen with reference to FIGS. 17A and 17C, lower brackets 267*b* and 269*b* of gate assembly 218 are pivotally mounted to gate panel 218*a* and pivotable relative to the panel about a generally horizontal pivot axis. Thus, when the lower brackets 267*b*, 269*b* of gate assembly 218 are attached to brackets 167*b*, 169*c* of receiving portion 113, and when pins 268, 266*a* are removed or disengaged from the upper brackets, gate panel 218*a* may pivot about the horizontal pivot axis relative to lower brackets 267*b*, 269*b* to open in a generally horizontal orientation such as shown in FIG. 17C. The gate assembly 218 thus is readily adaptable to open in different manners depending on the particular application of the material handling system and the desired manner of loading and/or unloading the receiving portion.

Figure 18:
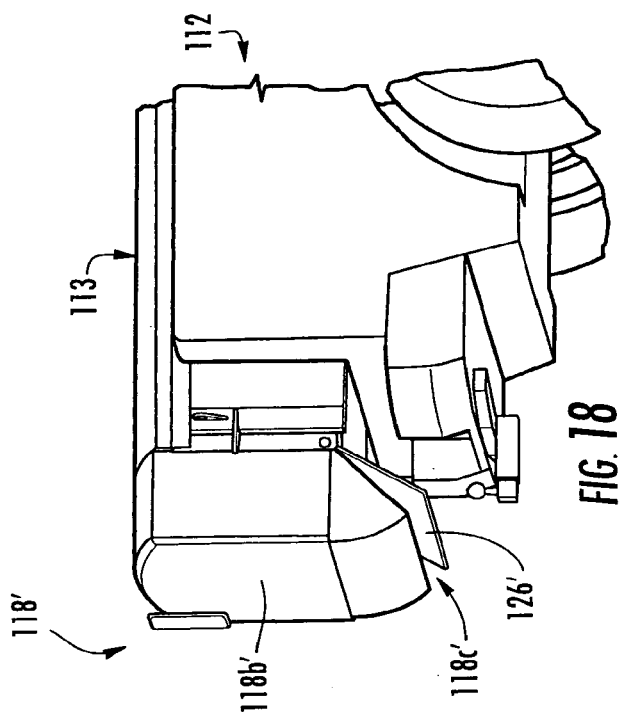
FIG. 18 is a lower side perspective view of a rear of a vehicle having the material handling device of the present invention, with a hopper and dispenser at the rearward end of the material handling device.

Optionally, other material processing attachments or units or devices may be attached to the rear of the receiving portion, depending on the particular application and desired function of the device. For example, and with reference to FIG. 18, a material processing device 118' may comprise a material dispensing or spreading device for dispensing material from within the receiving portion 113 to an external location at the rear of the vehicle. In the illustrated embodiment, material processing device 118' includes a hopper or chamber 118*b*' and a door or panel 126' that is operable or movable to open and close a discharge opening 118*c*' for dispensing material at the rear of the vehicle. As can be seen in FIG. 18, the hopper or chamber 118*b*' may provide a chamber generally at the level of the receiving portion so that material from within the receiving portion 113 may be pushed or moved via the material moving device 116 (not shown in FIG. 18) into the chamber 118*b*' for dispensing through discharge opening 118*c*'.

The material processing device 118' is attachable (and may be removably attachable and/or pivotally attachable) at the rear end of the receiving portion 113, such as in a similar manner as described above. Material processing device 118' may include a material moving mechanism, such as an auger or the like, within or at the hopper 118*b*', in order to move material to the discharge opening 118*c*' for dispensing when panel 126' is opened (as shown in FIG. 18). Optionally, the moving device 116 of receiving portion 113 may be operable to move the material in the receiving portion rearward and into the hopper where the moved material is pushed to the opening for dispensing from the material processing device 118'.

Figure 19A:
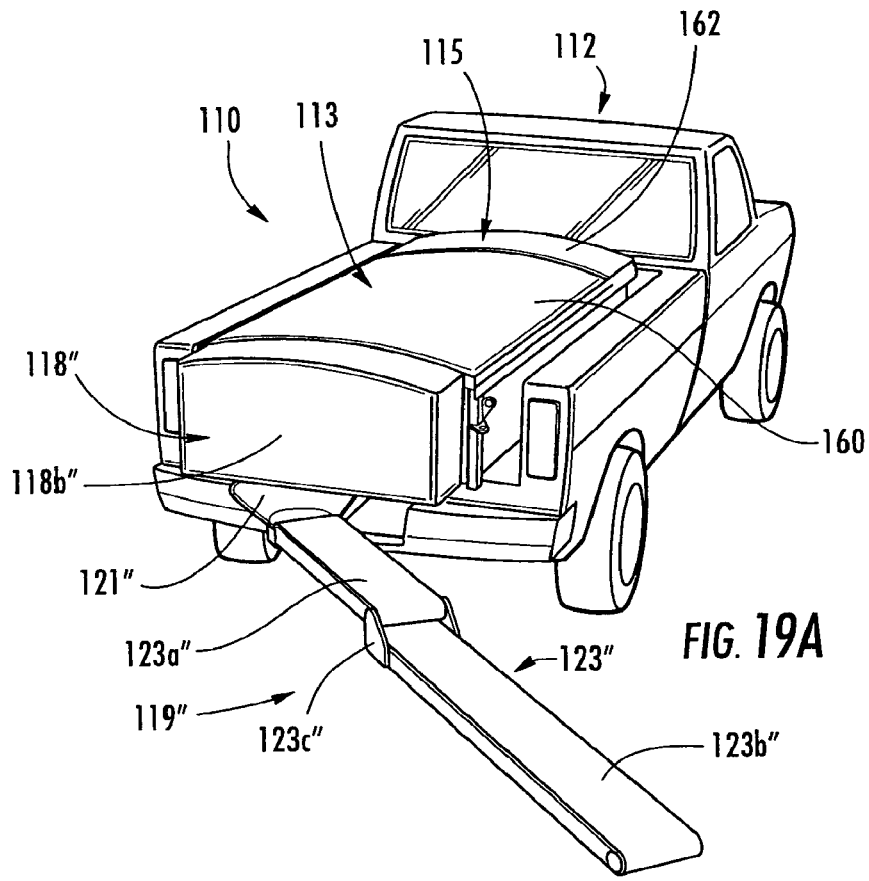
FIG. 19A is an upper rear perspective view of a vehicle having the material handling device of the present invention, with a conveyor belt dispenser at a dispensing portion of the material handling device.

Optionally, a material processing device 118'' (FIGS. 19A and 19B) may be similar to material processing device 118', but includes a dispensing or distributing or conveying device 119'' at a discharge opening of a hopper or chamber 118*b*''. Dispensing device 119'' includes a funnel or chute 121'' at the discharge opening of hopper 118*b*'', where material dispensed from the receiving portion 113, through the discharge opening and along funnel 121'' is received by a conveying device 123'' and conveyed along the conveying device for dispensing or distributing at an area of the ground or support surface at or near the rear of the vehicle. In the illustrated embodiment, conveying device 123'' is mounted at a lower or discharging end of funnel 121'' and is pivotable about a horizontal pivot axis to adjust an incline of the conveying device relative to the funnel. The funnel 121'' may be pivotally mounted to hopper 118b" or the conveying device 123" may be pivotally mounted to funnel 121" so that the conveying device is pivotable relative to the hopper 118b" about a generally vertical pivot axis. Conveying device 123" includes an upper conveyor section 123a" mounted at funnel 121" and a lower conveyor section 123b" pivotally mounted at an end of upper conveyor section 123a", such as via a mounting bracket 123c" attached at an end of lower conveyor section 123b" and pivotally attached at an end of upper conveyor section 123a".

Thus, upper conveyor section 123a" may extend from funnel 121" and may function to convey materials thereaong via movement or driving of a continuous conveyor belt (such as via a rotationally driven motor or roller or the like) of upper conveyor section 123a", whereby the conveyed materials are conveyed from funnel 121" and along upper conveyor section 123a" and onto the lower conveyor section 123b", which in turn conveys the materials therealong via movement or driving of a continuous conveyor belt (such as via a rotationally driven motor or roller or the like) of lower conveyor section 123b". The materials dispensed from hopper 118b" and through funnel 121" thus are conveyed along the conveyor sections 123a", 123b" and dispensed or discharged at the targeted area at or near the rear of the vehicle. A user may manually pivot the conveyor sections 123a", 123b" about the generally vertical pivot axis to direct the conveyor toward the targeted location so as to dispense the materials at the targeted location, and may move or pivot the conveyor sections about the generally vertical pivot axis during dispensing of the materials to spread the materials in an arcuate path at or near the targeted area.

The user may operate or control the conveyor and conveyor sections to control the rate of movement and discharging of the materials by the conveyor. The user may also control the opening and closing of a panel or door at the discharge opening of the hopper 118b" to control the rate of discharge of materials onto the conveyor. Such controls may also include control of the material moving device 116 of receiving portion 113 to control the rate of movement of the materials to and into the hopper 118b", such as in a similar manner as described above. The controls or user inputs may be at the outer end of the conveyor (or elsewhere along the conveyor) so that the user may readily access the controls or control panel, or the controls or user inputs may be at the receiving portion or engine compartment or elsewhere at the vehicle, while remaining within the spirit and scope of the present invention.

Figure 19B:
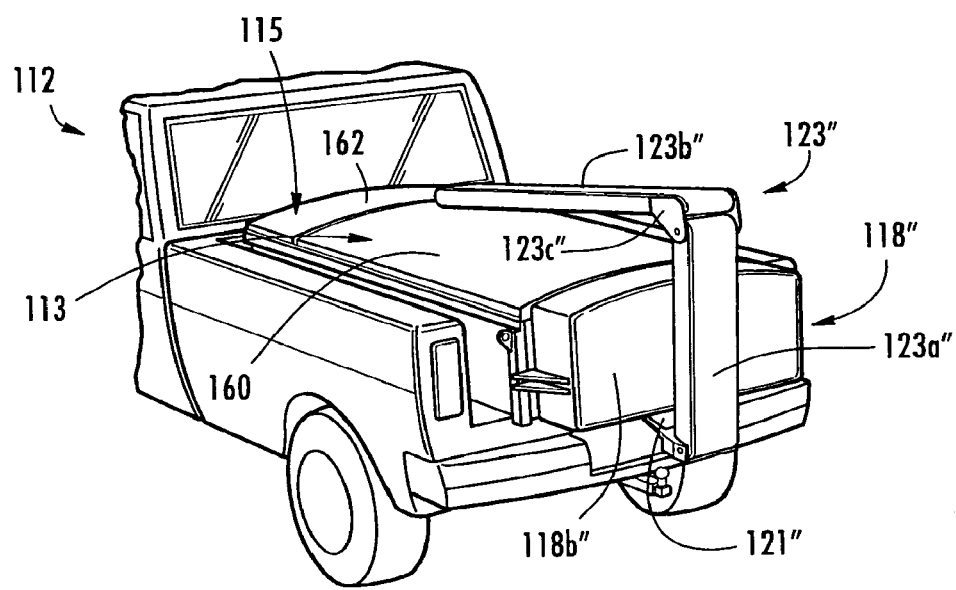
FIG. 19B is another perspective view of the vehicle and material handling device of FIG. 19A, with the conveyor belt dispenser in a storage or non-use position.

When no longer in use, and as shown in FIG. 19B, the conveyor sections may be folded generally upward, whereby the upper conveyor section 123a" is positioned generally vertically along the rear of the hopper 118b", and the lower conveyor section 123b" is pivoted to be generally above and along the cover element 160 of receiving portion 113. The conveyor sections may be substantially locked to limit pivotal movement of the conveyor sections or one or both of the conveyor sections may be securable to the hopper 118b" or to the receiving portion 113 to limit movement of the conveyor sections when in the storage or non-use position.

Optionally, a material processing device 318 (FIG. 20) may include a side discharge device 321, which is operable to discharge materials from within a hopper or chamber 318b toward one side of the material processing device 318. Material processing device 318 may be mounted to the rear portion of the receiving portion 113 and may be pivotally mounted thereto, such as in a similar manner as described above. In the illustrated embodiment, side discharge device 321 includes an auger 324 that extends across a lower region of hopper 318b and along a tube or pipe 324a at one side of and extending laterally outward from the hopper 318b. Auger 324 is rotatably driven by a hydraulic motor 325 to engage and move materials within the hopper 318b along the auger 324 and along and out of the tube or pipe 324a to discharge the materials from the material processing device 318. The material processing device 318 thus may discharge materials toward a side region at or near the vehicle in a controlled manner. It is further envisioned that the auger may be rotated in the opposite direction to draw materials into and along the tube and into the hopper and receiving portion. Optionally, the material processing device may include a material moving device or upper or second auger or the like at the hopper 318b to move. or break up the materials received in hopper 318b from receiving portion 113 or from auger 324 and tube 324a.

Figure 21:
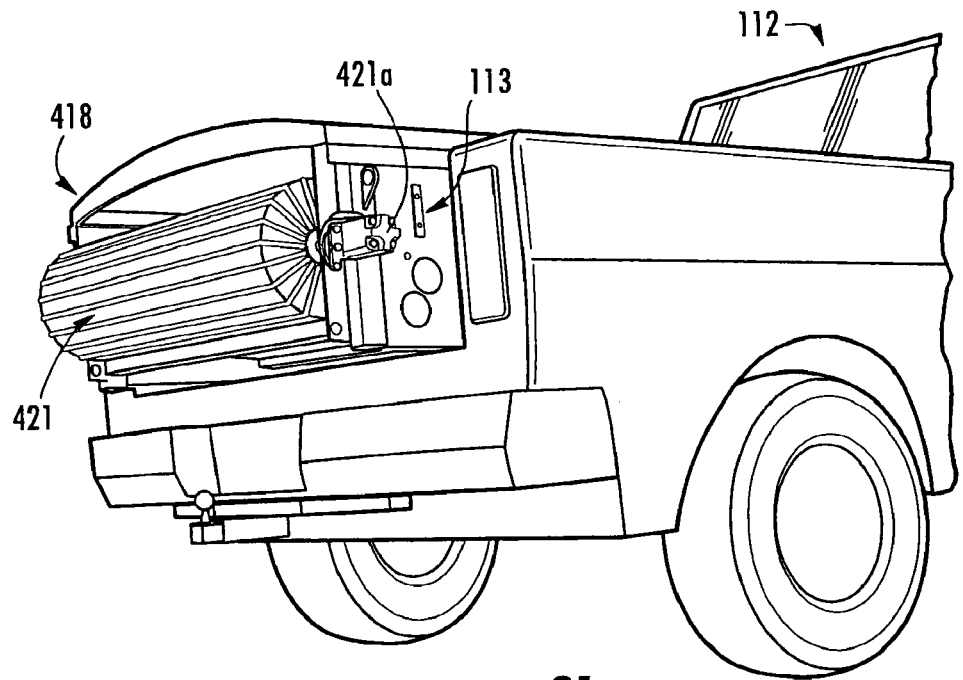
FIG. 21 is a lower perspective view of a vehicle having the material handling device of the present invention, with a brush dispensing device at the rearward end of the material handling device.

Optionally, and with reference to FIG. 21, a material processing device 418 may provide a dispensing function via a rotatable brush 421 that is rotatable via a hydraulic motor 421a or the like. The brush 421 is rotatably driven and may rotate in one direction (such as in the clockwise direction in FIG. 21) to sweep or move material from within a hopper or chamber portion 418b and within receiving portion 113 rearwardly to dispense or discharge the materials at the rear of the vehicle. The brush 421 may comprise any suitable brush material or configuration, such as a bristle-type cylindrical brush that rotates to brush or sweep the materials rearward to dispense the materials in a desired or appropriate manner. Optionally, the brush 421 may be rotatably driven in either direction to brush or scrub an article at the rear of the vehicle. Optionally, a brush and motor may be mounted to a frame element that is extendable or adjustable to move the brush downward to engage the road or support surface at the rear of the vehicle, whereby the brush may be rotatably driven to clean or sweep the road or support surface.

Figure 22:
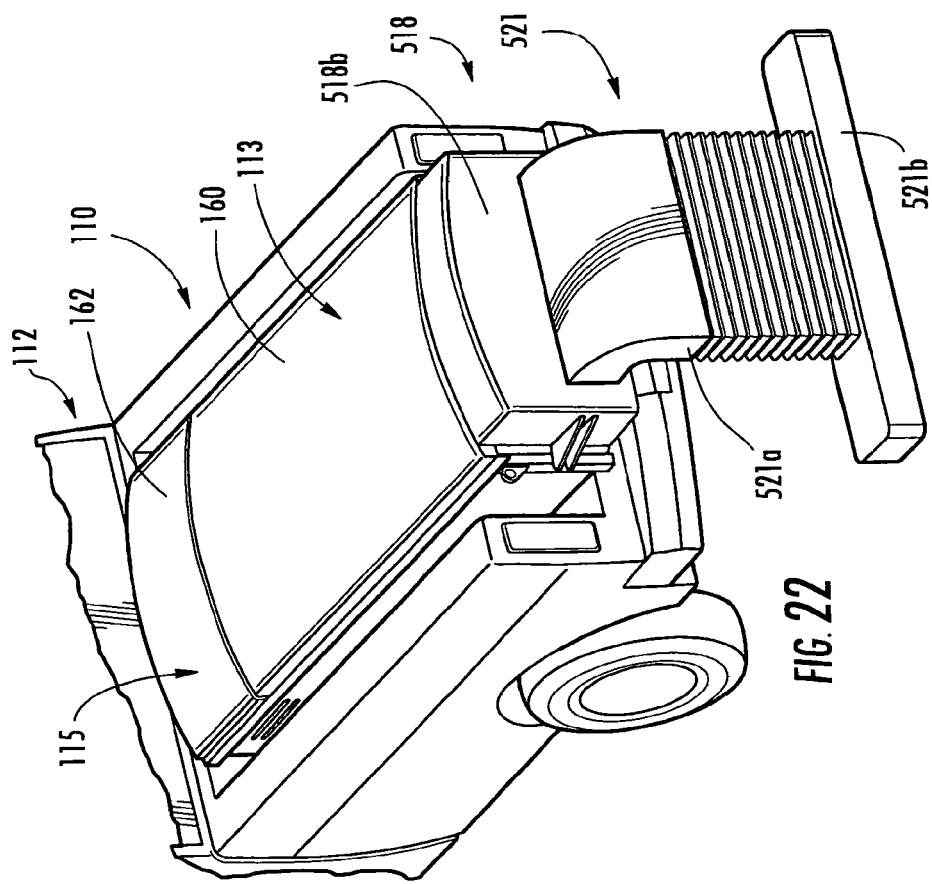
FIG. 22 is an upper perspective view of a vehicle having the material handling device of the present invention, with a street vacuuming device at the rearward end of the material handling device.

Optionally, and with reference to FIG. 22, a material processing device 518 may provide a suction device or vacuum device for vacuuming and/or cleaning surfaces, such as a road or support surface or the like. Material processing device 518 may be mounted to the rear portion of the receiving portion 113 and may be pivotally mounted thereto, such as in a similar manner as described above. In the illustrated embodiment, material processing device 518 includes a vacuum device or element 521 having a pipe or duct 521a that extends downwardly from a rear or underside of a bin or hopper or chamber 518b of material processing device 518. A vacuum head 521b may be positioned at a lower end of duct 521a and may be selected to substantially span a large area for cleaning or vacuuming dirt and debris from the surface. Material processing device 518 includes a vacuum generating device or blower or suction device at or in hopper 518b for creating a partial vacuum at the duct 521a for drawing materials through the vacuum head 521b and up the duct and into the hopper and receiving portion. The material processing device 518 thus may be operable to vacuum dirt and debris from a road or the like at or near the rear of the vehicle and to draw the dirt and debris into the hopper 518b and the receiving portion 113 (which is preferably covered to limit escape of the materials at the receiving portion). Optionally, and desirably, the vacuum duct 521a is extendable and retractable and adjustable or flexible (such as via an accordion type construction) so as to accommodate different levels and angles of the support surface or road.

Figure 23:
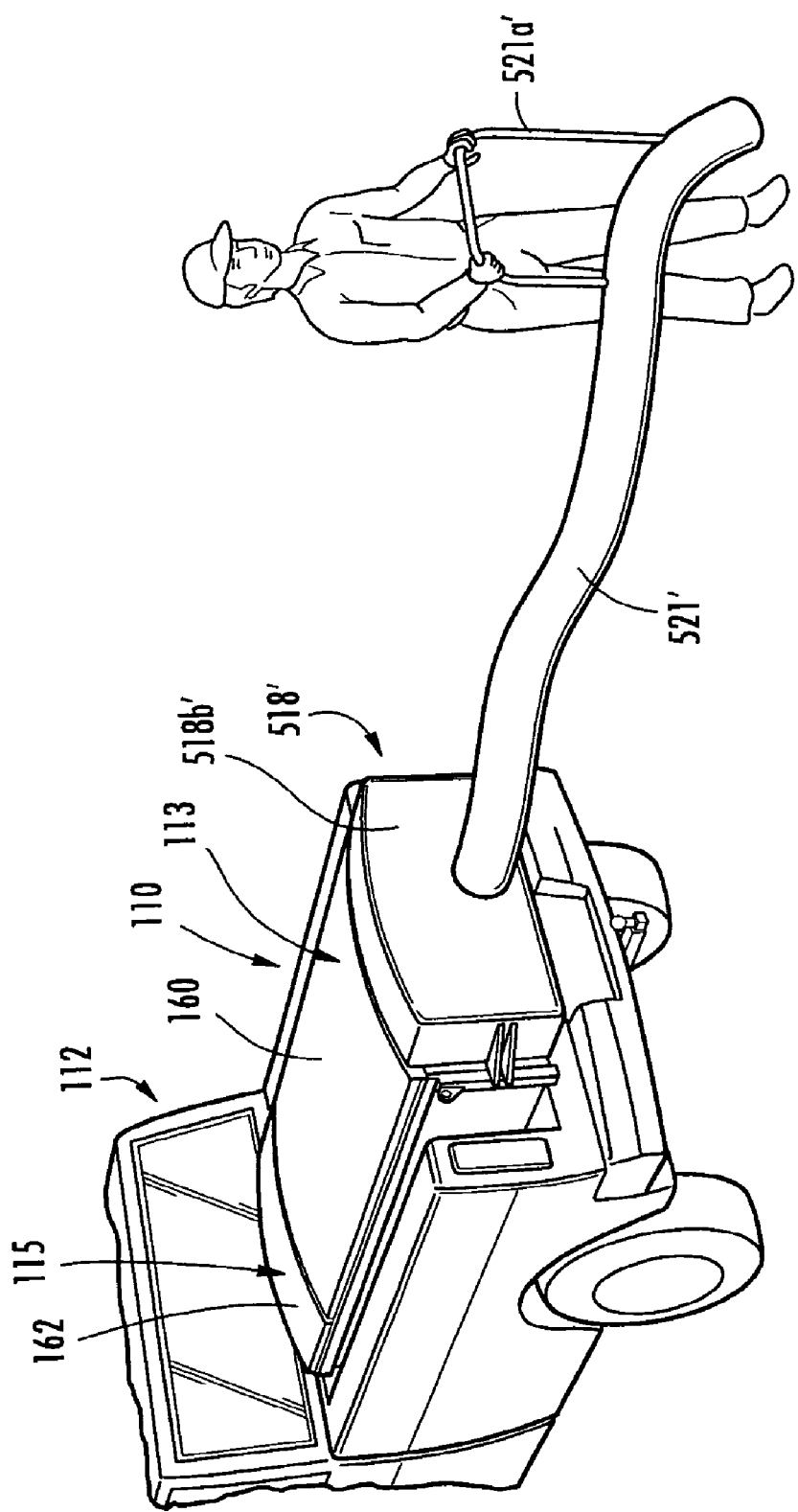
FIG. 23 is an upper perspective view of a vehicle having the material handling device of the present invention, with another vacuuming device at the rearward end of the material handling device.
Figure 24:
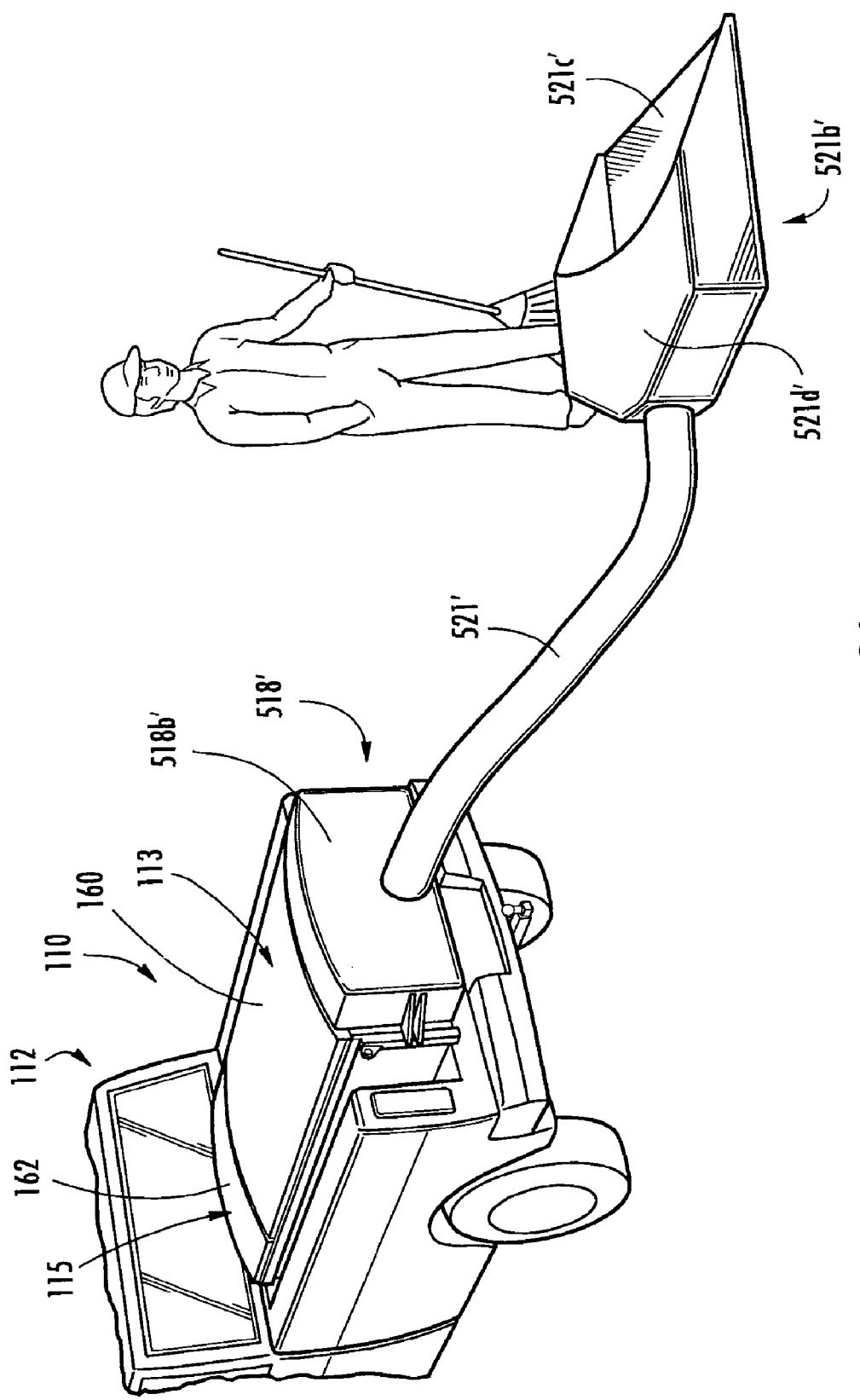
FIG. 24 is an upper perspective view of a vehicle having the material handling device of the present invention, with another vacuuming device at the rearward end of the material handling device.

Optionally, a material processing device 518' (FIG. 23) may comprise a vacuuming device that creates a partial vacuum within the hopper 518*b*' to draw material through a vacuum hose or tube 521' that is movable (such as by a user) to and around a targeted area at or near the rear of the vehicle for vacuuming or cleaning the targeted area. Optionally, the hose or tube 521' may comprise a flexible hose and may include a handle 521*a*' for a user to grasp for lifting and moving the hose to vacuum the desired or targeted location. Optionally, the tube 521' may include a large inlet element or material receiver 521*b*' (FIG. 24) at its outer end for vacuuming or drawing in materials placed at the large inlet element 521*b*'. As can be seen in FIG. 24, inlet element 521*b*' provides a generally flat base 521*c*' with a duct type configuration or housing 521*d*''' above and around the base and with an opening at the base and duct type configuration for receiving materials. Such a configuration may be suitable for use in vacuuming piles of leaves or grass or the like, where the leaves or grass may be raked or moved to or onto the large inlet element 521*b*' for vacuuming of the leaves or grass into the tube and further into the hopper 518*b*' and the receiving portion 113.

Figure 25A:
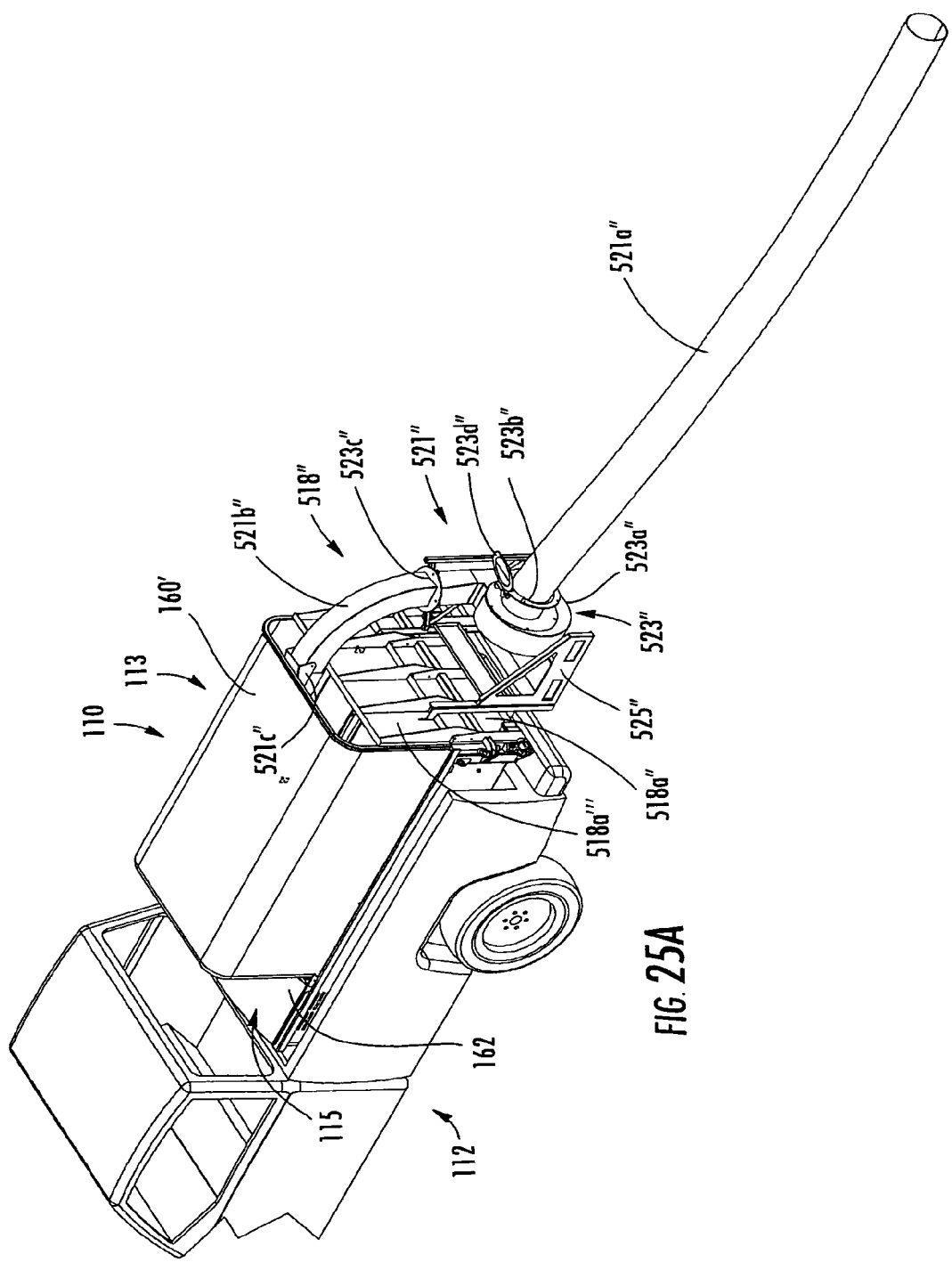
FIG. 25A is an upper perspective view of a vehicle having the material handling device of the present invention, with another vacuuming device at the rearward end of the material handling device.
Figure 25B:
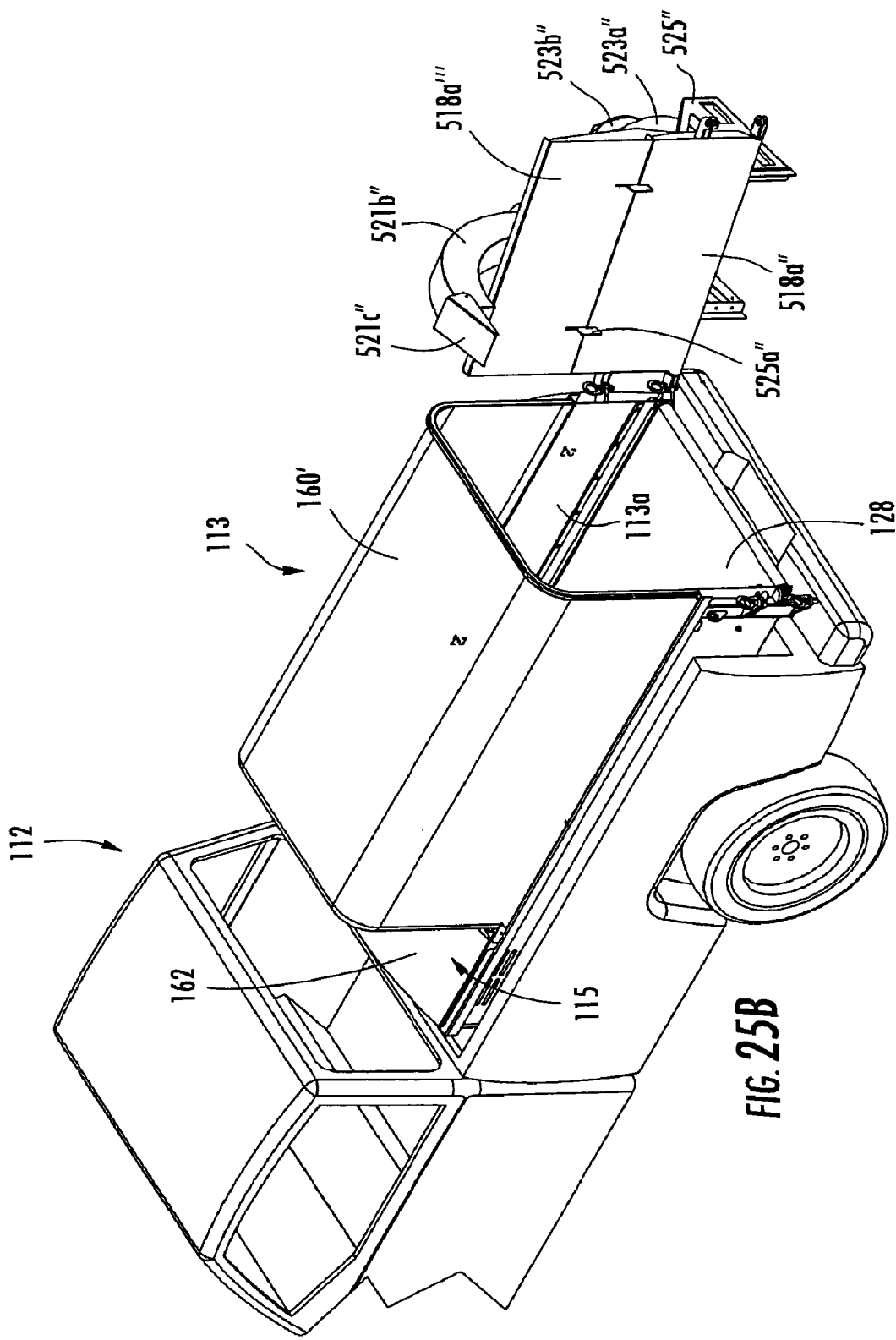
FIG. 25B is another upper perspective view of the vehicle and material handling device of FIG. 25A, with the rear gate and vacuuming device in an opened position.

Optionally, and with reference to FIGS. 25A and 25B, a material processing device 518'' may comprise a vacuuming or suction device 521'' for drawing in materials through an inlet tube or pipe 521*a*'' and for discharging the vacuumed or drawn in materials through a discharge conduit or pipe 521*b*'' and into receiving portion 113. Material processing device 518'' may be mounted to the rear portion of the receiving portion 113 and may be pivotally mounted thereto, such as in a similar manner as described above. In the illustrated embodiment, a vacuum generating device 523'' is mountable to a door or panel 518*a*'' of material processing device 518'', such as via a support frame 525''. The panel 518*a*'' is pivotally mounted to the rear of the receiving portion 113, such that the panel 518*a*'' and the vacuum generating device 523'' and inlet and outlet conduits 521*a*'', 521*b*'' are pivotable relative to the receiving portion 113, such as between an in-use position (such as shown in FIG. 25A) and an open position (such as shown in FIG. 25B) where the material may be removed from receiving portion 113 after vacuuming a substantial amount of materials into the receiving portion 113 (so that the receiving portion may be readily emptied).

Vacuum generating device 523'' includes a housing 523*a*'' with an inlet opening 523*b*'' and an outlet or discharge opening 523*c*'', and with a fan blade or other vacuum or suction generating element (not shown) that is rotatable or movable or operable within housing 523*a*'' to draw air (and dirt or debris or other material or the like) into inlet opening 523*b*'' and to discharge the air (and dirt or debris or other material or the like) through discharge opening 523*c*''. Housing 523*a*'' may be supported by support frame 525'' extending generally rearwardly from panel 518*a*'' so that the vacuum generating device 523'' is supported at and spaced from the gate or panel 518*a*'', and is operable to draw in air and material from a location external to and remote from the vehicle (via tube 521*a*''), and is operable to discharge the air and material toward and into the receiving portion 113.

As can be seen in FIG. 25A, inlet conduit or tube 521*a*'' may be removably attached at inlet opening 523*b*'' and may extend away from the vehicle to provide suction to vacuum or draw items or dirt or debris or material into the inlet conduit at a location remote from the vehicle. When inlet conduit 521*a*'' is removed from housing 523*a*'', a cover or closure panel or door 523*d*'' may be pivoted or moved to cover the inlet opening to limit entry of dirt and debris when the material processing device 518'' is not in use. Also, outlet conduit or tube 521*b*'' may be attached or removably attached at discharge opening and may extend generally upwardly therefrom and may curve generally forwardly so as to at least partially extend over or through panel 518*a*'' and into receiving portion 113. Outlet conduit 521*b*'' may comprise a substantially rigid pipe or conduit with a discharge control plate 521*c*'' at its outer end to control or limit upward discharging of material as the material is discharged into the receiving portion.

As can be seen with reference to FIGS. 25A and 25B, support frame 525'' may attach to or hook over an upper edge of panel 518*a*'', such as via a pair of hooking or attaching or supporting elements 525*a*'' (FIG. 25B), and a second or upper panel 518*a*'' ' may be positioned at or attached to the upper portion of panel 518*a*'' to form a higher profile panel assembly at the rear of the receiving portion 113. Preferably, receiving portion 113 is covered by a higher profile or larger cover element 160' that provides an increased amount of space within the receiving portion by providing a higher profile chamber defined by the receiving portion and the cover element. Cover element 160' may include a forward panel (not shown) to close the forward end of the receiving portion at and above the engine or power source compartment 115 and the cover 162 at the forward end of the material handling device.

The panels 518*a*'' and 518*a*'' ' extend above the side walls of receiving portion 113 and substantially upward toward the height of cover element 160' so that a gap between the upper edge of the upper panel 518*a*'' ' and the upper portion of the cover element 160' provides an inlet for a discharge end of discharge conduit 521*b*''. Thus, materials vacuumed or drawn in by vacuum generating device 523'' are discharged along and through discharge conduit 521*b*'' and into the larger containing area of the receiving portion and within the contained or covered receiving portion. A user thus may move the inlet conduit 521*a*'', such as manually and such as via a handle or the like, to draw air and dirt and debris into the inlet conduit at a targeted location. Optionally, a vacuum head or vacuum opening or duct may be provided at the outer or distal end of the inlet conduit 521*a*'', such as in a similar manner as described above.

Figure 26:
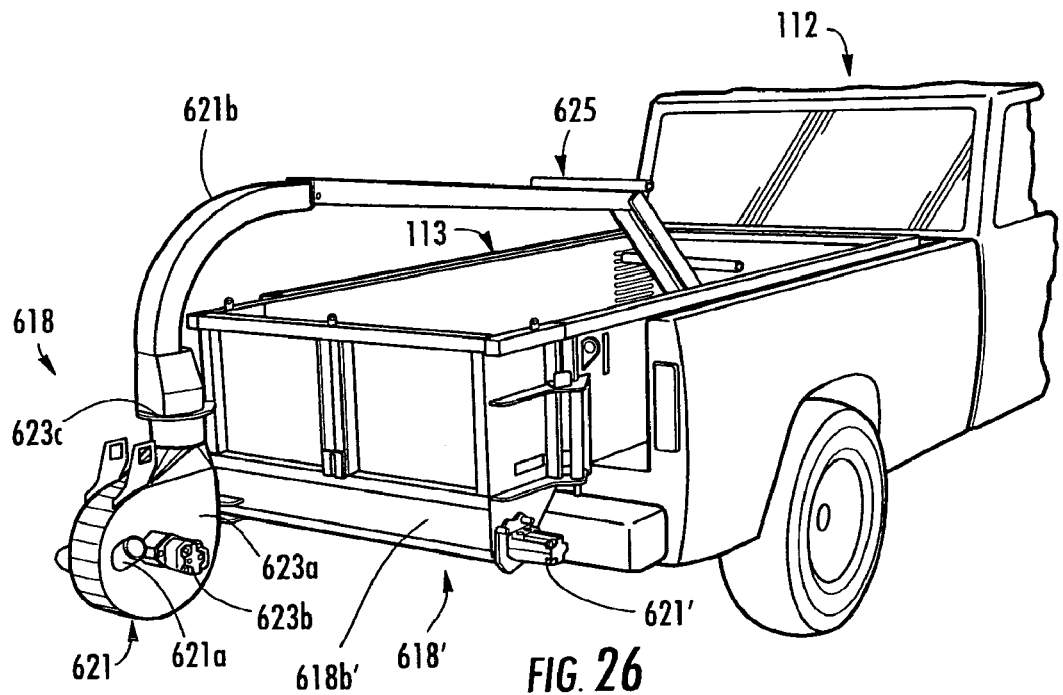
FIG. 26 is a perspective view of a vehicle having the material handling device of the present invention, with a chipping or shredding device at the rearward end of the material handling device.

Optionally, and with reference to FIG. 26, a material processing device 618 may comprise a chipper/shredder type of device for chipping and shredding materials, such as wood and the like, received at the chipper/shredder. Material processing device 618 may be mounted to the rear portion of the receiving portion 113 and may be pivotally mounted thereto, such as in a similar manner as described above. In the illustrated embodiment, a chipping or shredding device 621 is mounted or supported at a rear portion of vehicle and receiving portion 113 and is operable to chip and shred materials received therein or thereat (such as tree branches and the like received at an inlet 621*a* of chipping or shredding device 621) and to discharge the shredded materials through a discharge guide or conduit 621*b*, which guides and discharges the shredded materials into the receiving portion 113. The chipping and shredding device 621 includes a housing 623*a* with chipping blades or the like rotatably mounted within the housing. The blades may comprise any suitable chipping or shredding blades, such as are known in the art of chipper/shredder machines. The blades are rotatably driven (such as via a hydraulic motor 623*b*) to grind or chip or shred items inserted into the chipping or shredding device 621, whereby the rotation of the blades forces the chipped or shredded material outward through a discharge opening 623*c* of housing 623*a* and into and along discharge conduit 621*b*.

As can be seen in FIG. 26, discharge conduit 621b extends generally upwardly at the discharge opening 623c of housing 623a and is curved toward and at least partially over the receiving portion 113 so as to discharge the shredded material into the receiving portion 113 (which may have the cover element removed therefrom so as to readily receive the materials from the discharge conduit 621b generally above the receiving portion). Optionally, and as shown in FIG. 26, discharge conduit 621b may connect to a support arm or member 625 that is attached at one end to receiving portion 113 and that extends generally upwardly to mount or connect to a discharge end of discharge conduit 621b. Support arm 625 may mount or support or suspend chipping and shredding device 621 (including the housing 623a, motor 623b and discharge conduit 621b) at or near the rear of the receiving portion 113 (or to a side of the receiving portion or vehicle if desired), whereby the chipping and shredding device is positioned external of the vehicle for receiving materials (such as branches or the like) from external the vehicle and discharging the shredded materials to the receiving portion 113. Optionally, the chipping/shredding device 621 may be supported via a support frame (such as a support frame similar to support frame 525" discussed above) extending rearwardly from a door or panel at the rear of the receiving portion 113, or via a support frame extending rearwardly from a panel 618a' of a second material processing device 618' at the rear of the receiving portion 113.

Optionally, and as shown in FIG. 26, a second material processing device 618' may be mounted at the rear of the receiving portion 113, such as in a similar manner as described above. The second material processing device 618' may comprise a dispensing mechanism or device for dispensing material (such as the shredded material) from within the receiving portion 113 (and within a hopper or chamber 618b' of second material processing device 618) to a location external of the material handling device and the vehicle. For example, the second material processing device 618' may include an auger type discharge device or system with a hydraulic motor 621', such as the type described above with respect to FIG. 20, that is operable to discharge the shredded materials toward a side of the material handling device and vehicle. Optionally, the second material processing device 618' may comprise any other suitable discharging or dispensing or spreading devices that is operable to discharge or dispense or spread the shredded material within the receiving portion to a desired or targeted location or area exterior of the vehicle. Thus, the material handling device may chip or shred materials via the chipping/shredding device 621 and may dispense the chipped/shredded material from within the receiving portion to a targeted external location via the auger type discharge device or system.

Thus, the present invention provides a material handling device or system that is configured to be inserted into or positioned at or on or in a bed or platform or frame of a vehicle, such as a bed of a pickup truck or the like. The material handling device includes a receiving portion or unit and an engine compartment or power source compartment or portion or unit that are positionable in or at the vehicle bed. The receiving portion may include a material moving device that is operable or movable to move material within the receiving portion toward an outlet or opening or end region of the receiving portion, such as for discharging the material at an area external to the vehicle and material handling device. The material handling device also includes a material processing device that is operable to receive material from the receiving portion and to discharge the material at the exterior of the vehicle, such as at a rear of the vehicle, or to receive or collect material from exterior the vehicle and to discharge the material into the receiving portion. The material processing device may be pivotally mounted and/or removably mounted at the rear of the receiving portion and may be removed and replaced with another material processing device that provides a different function or feature at the rear of a common or standard receiving portion and engine compartment or power source.

The power source and/or material moving device and/or material processing device may be controlled or operated by a user at or near the vehicle or at the functional end or portion of the material processing device. For example, a control panel or one or more user inputs may be located at the receiving portion or power source to control or operate or activate/deactivate various devices, such as an engine and hydraulic pump and/or control valves, so as to control the operation of the material moving device and material processing device. Optionally, a control panel or user input/inputs may be located at an end portion of the material processing device, such as at an outer end of a conveyor or vacuum tube or chipper/shredder of a material processing device, whereby a user may readily access the controls to operate and control the conveyor or vacuum source or chipper/shredder or other device or devices associated with the material handling device. Optionally, a control panel or user input/inputs may be located at the vehicle, such as within the cabin of the vehicle, whereby a user may readily access the controls from within the vehicle. The controls or user inputs are electronically connected to the power source and control valves (and may disconnectable therefrom, particularly when located at the material processing device) to provide user control of the material handling device by a user at or near or in the vehicle at which the material handling device is mounted.

The material handling device or system of the present invention may be readily positioned at or in a vehicle bed or platform and may be readily removed therefrom when not in use. The material handling device may be movably supported at the ground or road or support surface as it is moved into and out from the vehicle to ease moving and installing and removing the material handling device. The height or level of the material handling device may be adjusted to generally align the material handling device with the vehicle bed or platform to ease insertion or loading or installing of the material handling device at the vehicle. Likewise, the height or level of one or more wheel assemblies of the material handling device may be adjusted to adjust the support level of the material handling device as the material handling device is removed from the vehicle bed to ease the removal and movement of the material handling device.

Although shown and described as being configured for installation in and use with a pickup truck, it is envisioned that the material handling device or system of the present invention may be adapted for use in other vehicles while remaining within the spirit and scope of the present invention. For example, a smaller or reduced size material handling device or system may be configured or adapted for use on and with a smaller vehicle, such as, for example, a utility all terrain vehicle (ATV) or the like, or an enclosed or covered or sealed material handling device or system may be configured or adapted for use on and with other vehicles, such as for use within a station wagon or sport utility vehicle (SUV) or the like, without affecting the scope of the present invention.

Therefore, the present invention provides a material handling device or system that provides a material receiving portion and a material processing device and that may be readily positionable in or at and removable from a vehicle, such as a pickup truck or the like. The material processing device may provide a desired function at the rear of the vehicle, such as a spreading or dispensing function or a vacuuming or cleaning function or a chipping or shredding function and/or the like, and may be changed to a different material processing device for use at the same or common material receiving portion and power source. The material receiving portion includes a material moving device for moving materials rearward and toward the material processing device, such as for moving materials toward a material processing device for dispensing or spreading the material at an exterior of the vehicle, or for moving materials toward a rear end portion of the material receiving portion for unloading the material from the material receiving portion when the material processing device is removed or moved to an open position. The material handling device or system of the present invention thus provides a selectively adaptable device for providing a variety of functions or features at a rear or side region of a vehicle, and with the device being readily removed from the vehicle when it is not in use.

Changes and modifications to the specifically described embodiments may be carried out without departing from the principles of the present invention, which is intended to be limited only by the scope of the appended claims, as interpreted according to the principles of patent law.

The invention claimed is:

1. A self-contained material handling system for a vehicle, said material handling system comprising:

a receiving portion for receiving material, said receiving portion being configured to fit at least partially in a vehicle bed, said receiving portion being removably positioned at least partially in a vehicle bed;

a material processing device attached to a rear of said receiving portion whereby the combination of said receiving portion and said material processing device comprises a unitary material handling unit, said material processing device of said material handling unit being at a rear of the vehicle bed when said receiving portion is at least partially in the vehicle bed, said material processing device being operable to at least one of (a) dispense material from within said receiving portion to a location external said receiving portion and (b) dispense material from a location external said receiving portion into said receiving portion; and said receiving portion and said material processing device being removable from the vehicle as a unit and being supported on the ground by at least one wheel when said material handling unit is at least partially removed from the vehicle bed.

2. The material handling system of claim 1, wherein said receiving portion includes at least one wheel for rollingly engaging the vehicle bed as said receiving portion is moved into and out from the vehicle bed.

3. The material handling system of claim 2, wherein said at least one wheel is positioned at a forward end of said material handling system such that said at least one wheel is positioned at a forward region of the vehicle bed when said receiving portion is at the vehicle bed.

4. The material handling system of claim 1, wherein said receiving portion and said material processing device are supported at the ground by a plurality of wheels rotatably mounted to respective legs extending downward from at least one of said receiving portion and said material processing device when said receiving portion is at least partially removed from the vehicle bed.

5. The material handling system of claim 4, wherein said plurality of legs comprise adjustable legs that are adjustable to adjust a degree of extension of said legs from said at least one of said receiving portion and said material processing device.

6. The material handling system of claim 4, wherein said plurality of legs and wheels comprise at least two legs and wheels spaced along each side of said material handling system.

7. The material handling system of claim 1, wherein said material processing device is removably attached to said rear of said receiving portion and is removable therefrom, said receiving portion being configured for selectively attaching a selected one of multiple material processing devices thereto.

8. The material handling system of claim 1 including a power source at a forward portion of said receiving portion, said power source operable to at least one of (a) provide power to said material processing device and (b) provide power to a material moving device that is operable to move material along said receiving portion.

9. The material handling system of claim 1 including a material moving device for moving material along said receiving portion, said material moving device comprising a conveyor extending substantially along said receiving portion and being movably driven to move material within said receiving portion toward said material processing device.

10. The material handling system of claim 9, wherein said material moving device includes a movable bulkhead that is movable with said conveyor to move material along said receiving portion toward said material processing device.

11. The material handling system of claim 8, wherein said material processing device comprises one of (a) a material spreading device for spreading material from said receiving portion to a location external said receiving portion; (b) a material dispensing device for dispensing material from said receiving portion to a location external said receiving portion; (c) a cleaning device for cleaning a location external said receiving portion; (d) a material vacuum device for vacuuming material at a location external said receiving portion and dispensing the vacuumed material into said receiving portion; (e) a material shredding device for shredding material from a location external said receiving portion and dispensing the shredded material into said receiving portion; and (f) a gate that is openable to insert material into or remove material from said receiving portion and closable to contain material within said receiving portion.

12. The material handling system of claim 1, wherein said receiving portion includes a cover element for substantially covering material contained within said receiving portion.

13. The material handling system of claim 1, wherein said material processing device comprises a material spreading device for spreading material from said receiving portion to a location external the vehicle bed.

14. The material handling system of claim 13, wherein said receiving portion holds bags of material and said material spreading device receives the bags from said receiving portion and supports the bags of material for opening and dispensing the material from the bags.

15. The material handling system of claim 14, wherein said material spreading device includes a plurality of T-shaped cutting elements for cutting open the bags of material as the bags of material are received at said material spreading device.

16. The material handling system of claim 1, wherein said material processing device comprises a gate panel that is openable to insert material into or remove material from said receiving portion and closable to contain material within said receiving portion, said gate panel being pivotally mounted to said rear of said receiving portion and being selectively pivotable about a generally vertical axis at a side of said receiving portion and about a generally horizontal axis at a lower portion of said receiving portion.

17. A self-contained material handling system for a vehicle, said material handling system comprising:
- a receiving portion for receiving material, said receiving portion being configured to fit at least partially in a vehicle bed, said receiving portion being removably positioned at least partially in a vehicle bed;
- a material moving system operable to move material along said receiving portion;
- a material processing device attached to a rear of said receiving portion whereby the combination of said receiving portion and said material processing device comprises a unitary material handling unit that is removable from the vehicle bed as a unit, said material processing device of said material handling unit being generally at a rear of the vehicle bed when said receiving portion is at least partially in the vehicle bed, said material processing device being operable to at least one of (a) dispense material from within said receiving portion to a location external said receiving portion and (b) dispense material from a location external said receiving portion into said receiving portion; and
- a power source at a forward portion of said material handling unit, said power source being selectively operable to (a) provide power to said material processing device; and (b) provide power to said material moving device.

18. The material handling system of claim 17, wherein said receiving portion and said material processing device are supported on the ground by a plurality of wheels when said material handling unit is at least partially removed from the vehicle bed.

19. The material handling system of claim 18 comprising at least one wheel at a forward end of said material handling unit for rollingly engaging the vehicle bed as said receiving portion is moved into and out from the vehicle bed.

20. The material handling system of claim 18, wherein at least some of said plurality of wheels are removably attached to said receiving portion.

21. The material handling system of claim 18, wherein said plurality of wheels are adjustably mounted to at least one of said receiving portion and said material processing device to adjust a degree of extension of said wheels from said at least one of said receiving portion and said material processing device.

22. The material handling system of claim 17, wherein said material moving device comprises a conveyor extending substantially along said receiving portion and being movably driven to move material within said receiving portion toward said material processing device.

23. The material handling system of claim 22, wherein said material moving device includes a movable bulkhead that is movable with said conveyor to move material along said receiving portion toward said material processing device.

24. The material handling system of claim 17, wherein said material processing device comprises one of (a) a material spreading device for spreading material from said receiving portion to a location external said receiving portion; (b) a material dispensing device for dispensing material from said receiving portion to a location external said receiving portion; (c) a cleaning device for cleaning a location external said receiving portion; (d) a material vacuum device for vacuuming material at a location external said receiving portion and dispensing the vacuumed material into said receiving portion; (e) a material shredding device for shredding material from a location external said receiving portion and dispensing the shredded material into said receiving portion; and (f) a gate that is openable to insert material into or remove material from said receiving portion and closable to contain material within said receiving portion.

25. The material handling system of claim 17, wherein said receiving portion includes a cover element for substantially covering material contained within said receiving portion.

26. The material handling system of claim 17, wherein said material processing device comprises a material spreading device for spreading material from said receiving portion to a location external the vehicle bed, said receiving portion holds bags of material and said material spreading device receives the bags from said receiving portion and supports the bags of material for opening and dispensing the material from the bags, wherein said material spreading device includes a plurality of cutting elements for cutting open the bags of material as the bags of material are received at said material spreading device.

27. The material handling system of claim 17, wherein said material processing device comprises a gate panel that is openable to insert material into or remove material from said receiving portion and closable to contain material within said receiving portion, said gate panel being pivotally mounted to said receiving portion and being selectively pivotable about a generally vertical axis at a side of said receiving portion and about a generally horizontal axis at a lower portion of said receiving portion.

28. The material handling system of claim 17, wherein said power source is selectively operable to (a) provide hydraulic fluid to at least one hydraulic motor of said material processing device; and (b) provide hydraulic fluid to at least one hydraulic motor of said material moving device.

* * * * *